United States Patent
Dou et al.

(10) Patent No.: US 12,355,842 B2
(45) Date of Patent: Jul. 8, 2025

(54) EXTENDED REALITY DATA TRANSMISSION METHOD AND APPARATUS

(71) Applicant: HUAWEI TECHNOLOGIES CO., LTD., Guangdong (CN)

(72) Inventors: Shengyue Dou, Shanghai (CN); Yuejun Wei, Shanghai (CN); Zhenfei Tang, Shanghai (CN); Guohua Zhou, Shanghai (CN); Nijun Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/931,529

(22) Filed: Sep. 12, 2022

(65) Prior Publication Data

US 2023/0007084 A1    Jan. 5, 2023
US 2024/0187486 A2    Jun. 6, 2024

Related U.S. Application Data

(63) Continuation of application No. PCT/CN2021/081935, filed on Mar. 20, 2021.

(30) Foreign Application Priority Data

Mar. 27, 2020    (CN) .......................... 202010230251.4

(51) Int. Cl.
*H04L 67/131*    (2022.01)
*H04L 1/00*    (2006.01)
(Continued)

(52) U.S. Cl.
CPC .......... *H04L 67/131* (2022.05); *H04L 1/0002* (2013.01); *H04L 1/0017* (2013.01);
(Continued)

(58) Field of Classification Search
CPC ... H04L 1/0002; H04L 1/0017; H04L 1/0023; H04L 1/0061; H04L 1/1671;
(Continued)

(56) References Cited

U.S. PATENT DOCUMENTS 11,080,933 B2 *   8/2021   Lee ...................... G06T 19/006
11,770,724 B2 *   9/2023   Kim ...................... H04W 24/08
                                                                  370/252
(Continued)

FOREIGN PATENT DOCUMENTS

CN    101483559 A    7/2009
CN    102904773 A    1/2013
(Continued)

OTHER PUBLICATIONS

Teniou, Gilles. "3GPP achievements on VR & ongoing developments on XR over 5G", VR Industry Forum Website, Dec. 31, 2019 [retrieved on Jun. 12, 2023]. Retrieved from the Internet: <URL: https://www.vr-if.org/wp-content/uploads/3GPP-achievements-on-VR-ongoing-developments-on-XR-over-5G.pdf>. (Year: 2019).*

(Continued)

*Primary Examiner* — Thomas J Dailey

(57) ABSTRACT

This application provides an extended reality data transmission method and an apparatus. The method includes: determining that a data type is extended reality data; determining, based on the data type, to obtain, based on delay information and transmission error information, extended reality quality indicator XQI information corresponding to a target rate, where the XQI information indicates transmission quality of the extended reality data; and performing communication based on the XQI information.

14 Claims, 9 Drawing Sheets

(51) Int. Cl.
  *H04L 1/1607* (2023.01)
  *H04L 1/1812* (2023.01)
  *H04L 1/20* (2006.01)
  *H04L 5/00* (2006.01)
  *H04L 41/5009* (2022.01)
  *H04L 41/5067* (2022.01)
  *H04L 43/0823* (2022.01)
  *H04L 43/0852* (2022.01)

(52) U.S. Cl.
  CPC .......... *H04L 1/0023* (2013.01); *H04L 1/0061* (2013.01); *H04L 1/1812* (2013.01); *H04L 1/203* (2013.01); *H04L 5/0053* (2013.01); *H04L 5/0055* (2013.01); *H04L 41/5009* (2013.01); *H04L 41/5067* (2013.01); *H04L 1/1671* (2013.01); *H04L 43/0847* (2013.01); *H04L 43/0852* (2013.01)

(58) Field of Classification Search
  CPC ..... H04L 1/1812; H04L 1/203; H04L 5/0053; H04L 5/0055; H04L 41/5009; H04L 41/5067; H04L 43/0847; H04L 43/0852; H04L 67/131
  See application file for complete search history.

(56) References Cited

U.S. PATENT DOCUMENTS

| | | | | |
|---|---|---|---|---|
| 11,838,494 | B2* | 12/2023 | Li | .................. H04N 13/106 |
| 12,019,841 | B2* | 6/2024 | Duan | ................... G06F 3/0486 |
| 2018/0196715 | A1 | 7/2018 | Balasubramanian et al. | |
| 2018/0359189 | A1 | 12/2018 | Ye et al. | |
| 2019/0393969 | A1 | 12/2019 | Kim | |
| 2021/0218790 | A1* | 7/2021 | Ringenberg | ............ H04L 65/80 |
| 2021/0281638 | A1* | 9/2021 | Vrcelj | ................. H04L 43/0882 |
| 2022/0182185 | A1* | 6/2022 | Bostrom | ............... H04L 1/1671 |

FOREIGN PATENT DOCUMENTS

| | | |
|---|---|---|
| CN | 108881894 A | 11/2018 |
| CN | 110622483 A | 12/2019 |
| WO | 2020013561 A1 | 1/2020 |

OTHER PUBLICATIONS

"3GPP TR 26.929 V16.1.0 (Sep. 2019) Technical Report on QoE parameters and metrics relevant to the Virtual Reality (VR) user experience", 3GPP website, Sep. 30, 2019 [retrieved on Jun. 12, 2023]. Retrieved from the Internet: <URL: https://www.3gpp.org/ftp/Specs/archive/26_series/26.929/26929-g10.zip>. (Year: 2019).*

"White Paper for 5G Cloud VR Service Experience Standards", Huawei website, Jun. 30, 2019 [retrieved on Jun. 12, 2023]. Retrieved from the Internet: <URL: https://carrier.huawei.com/~/media/CNBGV2/download/products/servies/White-Paper-for-5G-Cloud-VR-Service-Experience-Standards.pdf>. (Year: 2019).*

"Cloud VR Solution White Paper", Huawei website, Dec. 31, 2018 [retrieved on Jun. 12, 2023]. Retrieved from the Internet: <URL: https://www.huawei.com/minisite/pdf/ilab/cloud_vr_solutions_wp_en.pdf>. (Year: 2018).*

"Cloud VR Network Solution White Paper", Huawei website, Dec. 31, 2018 [retrieved on Jun. 12, 2023]. Retrieved from the Internet: <URL: https://www.huawei.com/minisite/pdf/ilab/cloud_vr_network_solution_white_paper_en.pdf>. (Year: 2018).*

Huawei et al, "Initial evaluation results for XR and Cloud Gaming", 3GPP TSG RAN WG1 Meeting #103-e R1-2008316, Nov. 13, 2020,total 3 pages.

Huawei et al, "Discussion on applications traffic model and evaluation methodology for XR and Cloud Gaming", 3GPP TSG RAN WG1 Meeting #103-e R1-2007561, Nov. 13, 2020, total 9 pages.

Series H: Audiovisual and Multimedia Systems Infrastructure of audiovisual services Coding of moving video, High efficiency video coding, Recommendation ITU-T H.265, Apr. 2015, 634 pages.

Fei Zesong et al: "QoE Evaluation Methods for 360-Degree VR Video Transmission",Nov. 27, 2019, pp. 78-88, XP011770009.

"3rd Generation Partnership Project; Technical Specification Group Services and System Aspects; Virtual Reality (VR) media services over 3GPP (Release 16)", 3GPP Draft; 26,918 V16.0.0,Dec. 21, 2018, XP051937299, total 129 pages.

Yong He (Interdigital) et al: "MPEG-1: VR Experience Metrics",Jul. 11, 2017, XP030069463,total 13 pages.

Huawei et al: "Discussion on applications, traffic model and evaluation methodology for XR and Cloud Gaming", 3GPP Draft; R1-2007561, Oct. 24, 2020, XP051946413, total 9 pages.

Huawei et al: "Initial evaluation results for XR and Cloud Gaming", 3GPP Draft; R1-2008316, Oct. 24, 2020, XP051946623, total 5 pages.

* cited by examiner

EXTENDED REALITY DATA TRANSMISSION METHOD AND APPARATUS

CROSS-REFERENCE TO RELATED APPLICATIONS

This application is a continuation of International Application No. PCT/CN2021/081935, filed on Mar. 20, 2021, which claims priority to Chinese Patent Application No. 202010230251.4, filed on Mar. 27, 2020. The disclosures of the aforementioned applications are hereby incorporated by reference in their entireties.

TECHNICAL FIELD

This application relates to the field of communication technologies, and in particular, to an extended reality data transmission method and an apparatus.

BACKGROUND

In a wireless communication network, an extended reality (XR) technology has advantages such as multi-view and strong interaction, can provide brand-new visual experience for a user, and has a great application value and great business potential. The XR includes technologies such as virtual reality (VR), augmented reality (AR), and mix reality (MR), and can be widely applied to various fields such as entertainment, gaming, healthcare, advertising, industry, online education, and engineering.

XR data requires to be transmitted on the network in real time and at a high speed. Whether these requirements are met is usually determined depending on user experience. However, user experience of network transmission of the XR data is a subjective feeling of the user, and objective impact on the XR data during network transmission cannot be accurately measured. Consequently a network operator cannot be systematically helped to perform network optimization for the XR data. Therefore, how to measure the impact on the XR data during network transmission more systematically and objectively to guide network design and guide the network operator to optimize the network based on the XR data becomes an urgent problem to be resolved.

SUMMARY

Embodiments of this application provide an extended reality data transmission method and an apparatus.

According to a first aspect, an embodiment of this application provides a communication method. The method may be performed by a terminal, a network device, a server, or a centralized controller, or may be performed by a component (for example, a processor, a chip, or a chip system) of a terminal, a network device, a server, or a centralized controller. The method includes: obtaining, based on delay information and transmission error information, extended reality quality indicator (XR quality indicator/index, XQI) information corresponding to a target rate, where the XQI information indicates transmission quality of extended reality data; and performing communication based on the XQI information. The XQI information corresponding to the target rate may also be understood as that the XQI indicated by the XQI information corresponds to the target rate. The obtaining, based on delay information and transmission error information, XQI information corresponding to a target rate may also be understood as that there is a correspondence between the XQI and a delay value indicated by the delay information and a transmission error rate indicated by the transmission error information. The performing communication based on the XQI information may be outputting the XQI information, or sending or receiving the XR data based on the XQI information.

Because the XQI information can represent transmission quality of the XR data in a network, objective impact on the XR data in network transmission can be systematically evaluated by using the method, to guide a network design and guide a network operator to maintain and optimize the network based on a requirement of the XR data.

Optionally, the delay information includes packet delay budget (PDB) information and/or delay variation information. The PDB information indicates a PDB, and the PDB indicates how long a data packet needs to be correctly transmitted. The delay variation information indicates a change of a delay. Optionally, the delay information further includes packet average delay information and/or delay variance information. The average delay information indicates an average value of the delay or the PDB in a period of time. The delay variance information indicates a variance of the delay. By using the foregoing specific delay information, delay impact on the XR data during transmission in the network can be evaluated from different dimensions, to guide a network design and guide a network operator to maintain and optimize the network according to a delay requirement of the XR data.

Optionally, the transmission error information includes one or more of packet error rate (PER) information, block error rate (BLER) information, retransmission information, average packet loss rate information, burst packet loss rate information, or first packet response time information. The PER (which may also be referred to as a packet error rate) information indicates a ratio of a quantity of incorrectly received data packets to a total quantity of received data packets. The BLER information indicates a ratio of a quantity of incorrectly received data blocks to a total quantity of received data blocks. The retransmission information may indicate, for example, a quantity of hybrid automatic repeat request (HARQ) retransmission times, or acknowledgment response (ACK) or negative acknowledgment response (NACK) information reported by a terminal device to a base station. The average packet loss rate information may indicate a rate of packet loss in a period of time. The burst packet loss rate information may indicate a packet loss rate of a burst service from the beginning to the end. The first packet response time information may indicate time from starting to send the first packet to receiving an acknowledgment response (ACK) for the packet. By using the foregoing transmission error information, impact of transmission error on the XR data during transmission in the network can be evaluated from different dimensions, to guide a network operator to maintain and optimize the network according to a reliability requirement of the XR data.

Optionally, the target rate includes a source rate and/or a network transmission rate of the XR data. The source rate of the XR data may be understood as a data rate of an XR video source and/or audio source, or may be understood as a data output rate of the XR video source and/or audio source at a source end. The network transmission rate may be understood as a transmission rate of data in an access network.

The XQI information corresponding to the target rate is reflected by using the foregoing delay information and transmission error information that represent objective impact on network transmission, and the XQI information is mapped to the target rate, so that a more flexible indicator can be provided for transmission quality of the XR data in the network, to provide a controllable and quantifiable evaluation basis for network maintenance and optimization based on an XR data requirement.

Optionally, there is a correspondence between a value range of the XQI and transmission quality of the XR data and/or user experience of the XR service. User experience of the XR service may be evaluated, for example, by using one or more of the following indicators: image definition, image smoothness, image distortion, image stereoscopy, image black borders, image smearing, sound quality, sound effect, angle of view, freezing, artifacts, dizziness, audio and video synchronization, interaction freedom, interaction operation response speed, interaction operation precision, or content loading speed. In this manner, subjective experience of a user on the XR data can be better reflected by using the XQI, so that an operator can be guided to perform more targeted optimization on network transmission of the XR data based on user experience.

Optionally, the XQI information corresponds to a first extended reality data stream and a second extended reality data stream, where the XQI information includes first XQI information and second XQI information, the first XQI information corresponds to the first extended reality data stream, and the second XQI information corresponds to the second extended reality data stream. It may also be understood as that XQIs included in the XQI information correspond to a first extended reality data stream and a second extended reality data stream, where the XQIs include a first XQI and a second XQI, the first XQI corresponds to the first extended reality data stream, and the second XQI corresponds to the second extended reality data stream. The first extended reality data stream and the second extended reality data stream may be one of the following cases.

The first extended reality data stream includes an extended reality base layer data stream, and the second extended reality data stream includes an extended reality enhancement layer data stream. The extended reality base layer data stream and the extended reality enhancement layer data stream may be extended reality data streams obtained by encoding source data of the XR. The encoding may be, for example, high efficiency video coding (HEVC), scalability extension of HEVC (SHVC), or another video coding scheme that can distinguish different data streams. This is not limited in the present application.

The first extended reality data stream includes an extended reality in-field of view (FOV) data stream, and the second extended reality data stream includes an extended reality out-of-FOV data stream. The extended reality in-FOV data stream and the extended reality out-of-FOV data stream may be extended reality data streams obtained by performing FOV source coding on the source data of the XR. The FOV source coding may divide the source data of the XR into an in-view part and an out-of-view part, where the in-view part corresponds to the extended reality in-FOV data stream, and the out-of-view part corresponds to the extended reality out-of-FOV data stream.

XQIs are independently allocated to different extended reality data streams, so that extended reality data with different transmission requirements can be differentiated. Different transmission policies are separately used for an extended reality data stream with a higher priority and an extended reality data stream with a lower priority, so that XR data can be transmitted more efficiently by using limited network resources.

With reference to the first aspect, in some implementations of the first aspect, the XQI information (or an XQI indicated by the XQI information) is obtained based on the source rate, the network transmission rate, the delay information, and the transmission error information of the XR data. For example, when the network transmission rate is greater than or equal to the source rate of the XR data, the XQI is obtained based on the delay information and the transmission error information; or when the network transmission rate is less than the source rate of the XR data, the XQI is obtained based on the network transmission rate, the delay information, and the transmission error information. It may also be understood as that, when the network transmission rate is greater than or equal to the source rate of the XR data, there is a correspondence between the XQI and the delay information and the transmission error information; or when the network transmission rate is less than the source rate of the XR data, there is a correspondence between the XQI and the delay information, the transmission error information, and the network transmission rate. In this implementation, the source rate and the network transmission rate of the XR data can be better matched, so that the network operator can be guided to provide a more matched resource and mode for transmission of the XR data.

With reference to the first aspect, in some implementations of the first aspect, capacity information may be further obtained based on the XQI information and the target rate. Optionally, the capacity information includes terminal capacity information and/or network capacity information. The terminal capacity information may be understood as an equivalent capacity of the terminal at a given target rate. The network capacity information may be understood as an equivalent capacity of the network when all terminals in the network are considered.

With reference to the first aspect, in some implementations of the first aspect, for a terminal or a user included in a network, statistics may be further collected on distribution of an XQI of the terminal or the user, for example, a cumulative distribution function (CDF) of the XQI, to measure performance of supporting the XR service by the network. For example, in the CDF of the XQI, a proportion of terminals or users corresponding to the XQI may be obtained. For example, a larger XQI indicates better user experience. If a proportion of terminals or users corresponding to a large XQI is high, the network supports the XR service well. If a proportion of terminals or users corresponding to a small XQI is high, the network supports the XR service poorly.

The capacity information is obtained based on the XQI information and the target rate, so that an overall network capacity can be quantitatively evaluated, and the network operator can be guided to adapt the network resource based on a capacity requirement of the XR data, to use the network resource more efficiently.

With reference to the first aspect, in some implementations of the first aspect, first evaluation information and second evaluation information may be further obtained, and third evaluation information is obtained based on the XQI information, the first evaluation information, and the second evaluation information. The first evaluation information indicates source quality of the XR data, the second evaluation information indicates a capability of processing the XR data, the third evaluation information indicates user experience in an end-to-end process of the XR service, and the end-to-end process includes generation of the XR data, transmission of the XR data, and processing of the XR data. For example, the source quality of the XR data may be used to evaluate one or more of the following indicators of the XR video source and/or audio source: image content, image definition, image smoothness, image stereoscopy, image distortion, frame rate, audio quality, or rendering effect. The capability of processing the XR data, for example, may be used to evaluate a capability of an XR terminal to process and/or display the XR data, for example, a supported FOV angle and/or refresh rate. The capability of processing the XR data, for example, may be further used to evaluate one or more of indicators such as a battery life, wearing comfort, wearing fatigue, portability, or visual impairment friendliness of the XR terminal.

User experience in the end-to-end process of the XR service can be obtained based on evaluation information about the data source, terminal, and transmission pipe of the XR service, so that an end-to-end comprehensive evaluation system can be established for the XR service, to guide the network operator to maintain and optimize the network based on the evaluation system to meet the requirement of the XR service.

With reference to the first aspect, in some implementations of the first aspect, it may be further determined that a data type is extended reality data. The obtaining, based on delay information and transmission error information, XQI information corresponding to a target rate may be implemented as follows: determining, based on the data type, to obtain, based on delay information and transmission error information, XQI information corresponding to a target rate, where the XQI information indicates transmission quality of the extended reality data. In an implementation of determining that the data type is the extended reality data, data type information may be obtained, and it is determined, based on the data type information, that the data type is the extended reality data. For example, the data type information may indicate that the data type is the extended reality data. Optionally, the data type information may be obtained by receiving downlink control information (DCI) or higher layer signaling, or the data type information may be obtained by receiving uplink control information (UCI) or higher layer signaling. In another implementation of determining that the data type is the extended reality data, it may be determined, based on configuration information of a core network, that the data type information is the extended reality data. In another implementation of determining that the data type is the extended reality data, it may be determined, based on a service characteristic of the data, that the data type of the data is the extended reality data.

In this implementation, after it is learned that the data type is the extended reality data, the XQI information indicating the transmission quality of the extended reality data is obtained based on a corresponding parameter, so that XQI-based transmission quality measurement and evaluation can be performed on the extended reality data more pertinently, to guide the network design for data of the XR type, and guide the network operator to maintain and optimize the network based on the requirement of the XR data.

According to a second aspect, an embodiment of this application provides a communication method. The method may be performed by a terminal, a network device, a server, or a centralized controller, or may be performed by a component (for example, a processor, a chip, or a chip system) of a terminal, a network device, a server, or a centralized controller. The method includes: determining that a data type is extended reality data, and reporting XQI information or reporting information related to an XQI based on the data type. Optionally, the information related to the XQI includes one or more of PDB information, delay variation information, average delay information, delay variance information, PER information, BLER information, retransmission information, average packet loss rate information, burst packet loss rate information, or first packet response time information related to the extended reality data.

With reference to the second aspect, in some implementations of the second aspect, when the XQI information is reported, to-be-reported XQI information may be further obtained based on delay information and transmission error information before the XQI information is reported.

In the foregoing method and implementation, after it is learned that the data type is the extended reality data, the XQI information related to the extended reality data is reported or parameter information required by the XQI is obtained, so that XQI-based transmission quality measurement and evaluation can be performed on the extended reality data more pertinently, to guide the network design for data of the XR type, and guide the network operator to maintain and optimize the network based on the requirement of the XR data.

According to a third aspect, an embodiment of this application provides an apparatus. The apparatus may implement the method according to any one of the first aspect or the implementations of the first aspect. The apparatus includes a corresponding unit or component configured to perform the foregoing method. The unit included in the apparatus may be implemented by software and/or hardware. For example, the apparatus may be a terminal, a network device, a server, or a centralized controller, or may be a chip, a chip system, or a processor that can support the terminal, the network device, the server, or the centralized controller in implementing the foregoing method.

According to a fourth aspect, an embodiment of this application provides an apparatus. The apparatus may implement the method according to any one of the second aspect or the implementations of the second aspect. The apparatus includes a corresponding unit or component configured to perform the foregoing method. The unit included in the apparatus may be implemented by software and/or hardware. For example, the apparatus may be a terminal, a network device, a server, or a centralized controller, or may be a chip, a chip system, or a processor that can support the terminal, the network device, the server, or the centralized controller in implementing the foregoing method.

According to a fifth aspect, an embodiment of this application provides an apparatus. The apparatus includes a processor. The processor is coupled to a memory. The memory is configured to store a program or instructions. When the program or the instructions are executed by the processor, the apparatus is enabled to implement the method according to any one of the first aspect or the implementations of the first aspect.

According to a sixth aspect, an embodiment of this application provides an apparatus. The apparatus includes a processor. The processor is coupled to a memory. The memory is configured to store a program or instructions. When the program or the instructions are executed by the processor, the apparatus is enabled to implement the method according to any one of the second aspect or the implementations of the second aspect.

According to a seventh aspect, an embodiment of this application provides a computer-readable medium, storing a computer program or instructions. When the computer program or the instructions are executed, a computer is enabled to perform the method in any one of the first aspect or the implementations of the first aspect.

According to an eighth aspect, an embodiment of this application provides a computer-readable medium, storing a computer program or instructions. When the computer program or the instructions are executed, a computer is enabled to perform the method in any one of the second aspect or the implementations of the second aspect.

According to a ninth aspect, an embodiment of this application provides a computer program product. The computer program product includes computer program code. When the computer program code is run on a computer, the computer is enabled to perform the method according to any one of the first aspect or the implementations of the first aspect.

According to a tenth aspect, an embodiment of this application provides a computer program product. The computer program product includes computer program code. When the computer program code is run on a computer, the computer is enabled to perform the method according to any one of the second aspect or the implementations of the second aspect.

According to an eleventh aspect, an embodiment of this application provides a chip. The chip includes a processor. The processor is coupled to a memory. The memory is configured to store a program or instructions. When the program or the instructions are executed by the processor, the chip is enabled to implement the method according to any one of the first aspect or the implementations of the first aspect.

According to a twelfth aspect, an embodiment of this application provides a chip. The chip includes a processor. The processor is coupled to a memory. The memory is configured to store a program or instructions. When the program or the instructions are executed by the processor, the chip is enabled to implement the method according to any one of the second aspect or the implementations of the second aspect.

DESCRIPTION OF EMBODIMENTS

Figure 1:
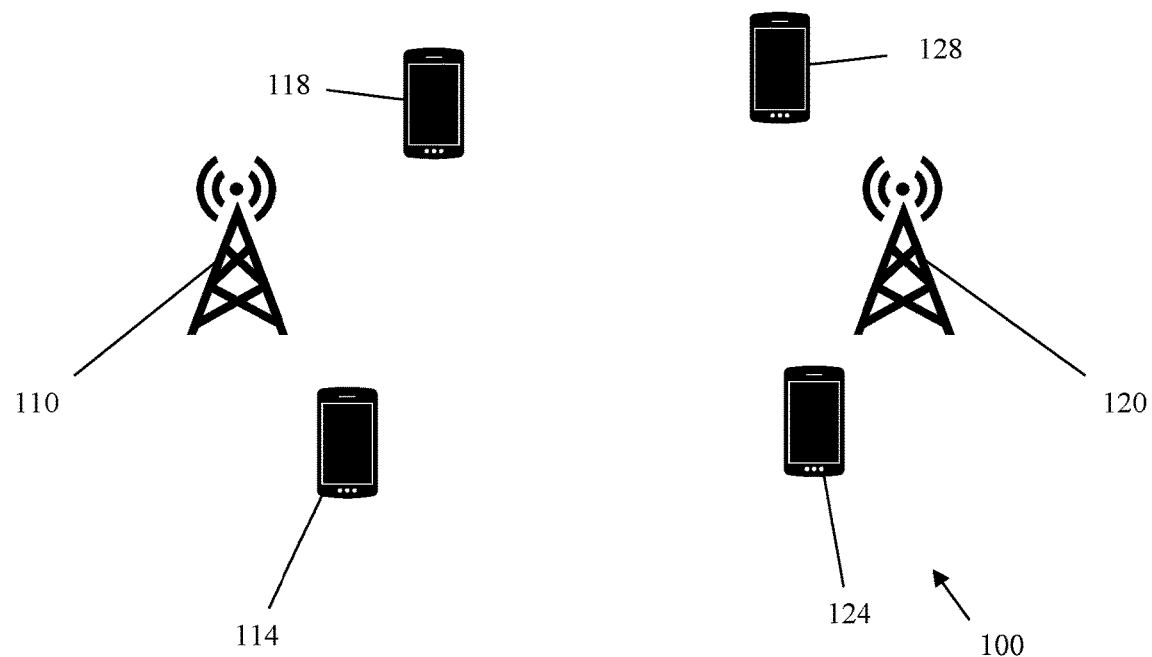
FIG. 1 is a diagram of a communication system used in an embodiment of this application.

A method and an apparatus provided in embodiments of this application may be applied to a communication system. FIG. 1 is a diagram of a structure of a communication system. The communication system 100 includes one or more network devices (a network device 110 and a network device 120 shown in the figure), and one or more terminals that communicate with the one or more network devices. A terminal 114 and a terminal 118 shown in FIG. 1 communicate with the network device 110, and a terminal 124 and a terminal 128 shown in FIG. 1 communicate with the network device 120. It may be understood that the network device and the terminal may also be referred to as communication devices.

Technologies described in embodiments of the present application may be applied to various communication systems, for example, a 4th generation (4G) communication system, a 4.5G communication system, a 5G communication system, a system converged by a plurality of communication systems, and a future evolved communication system (for example, a 6G communication system). For example, the technologies may be applied to a long term evolution (LTE) system, a new radio (NR) system, a wireless fidelity (Wi-Fi) system, a wireless self-organizing system, a device-to-device direct communication system, a communication system related to the 3rd Generation Partnership Project (3GPP), and another communication system of this type.

Figure 2:
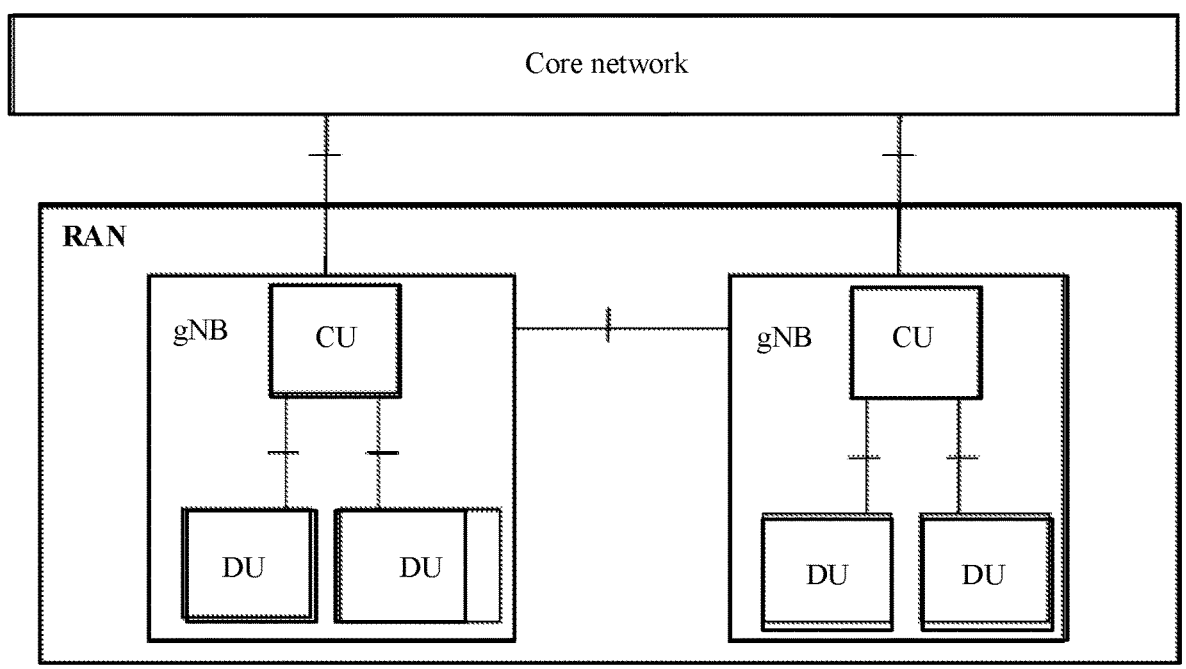
FIG. 2 is a diagram of an example of an architecture of a communication system.

FIG. 2 is a diagram of an example of an architecture of a communication system. As shown in FIG. 2, a network device in a radio access network (RAN) includes a base station (for example, a gNodeB or a gNB) with an architecture in which a centralized unit (CU) and a distributed unit (DU) are separated. The RAN may be connected to a core network (for example, may be an LTE core network or a 5G core network). It may be understood that the base station is divided into the CU and the DU from the perspective of a logical function. The CU and the DU may be physically separated or deployed together. A plurality of DUs may share one CU. One DU may alternatively be connected to a plurality of CUs (not shown in the figure). The CU and the DU may be connected through an interface, for example, an F1 interface. The CU and the DU may be obtained through division based on protocol layers of a wireless network. For example, functions of a packet data convergence protocol (PDCP) layer and a radio resource control (RRC) layer are distributed to the CU, but functions of a radio link control (RLC) layer, a media access control (MAC) layer, and a physical layer are distributed to the DU. It may be understood that, division into processing functions of the CU and the DU based on the protocol layers is merely an example, and there may be other division. For example, the CU or the DU may have functions of more protocol layers through division. For example, the CU or the DU may alternatively have some processing functions of the protocol layers through division. In a design, some functions of the RLC layer and functions of a protocol layer above the RLC layer are distributed to the CU, and remaining functions of the RLC layer and functions of a protocol layer below the RLC layer are distributed to the DU. In another design, functions of the CU or the DU may alternatively be obtained through division based on a service type or another system requirement. For example, division is performed based on a delay, a function whose processing time needs to satisfy a delay requirement is distributed on the DU, and a function whose processing time does not need to satisfy the delay requirement is distributed on the CU. A network architecture shown in FIG. 2 may be applied to a 5G communication system, and may alternatively share one or more components or resources with an LTE system. In another design, the CU may alternatively have one or more functions of a core network. One or more CUs may be disposed in a centralized manner or a separated manner. For example, the CUs may be disposed on a network side for ease of centralized management. The DU may have a plurality of radio frequency functions, or the radio frequency functions may be remotely set.

The function of the CU may be implemented by one entity, or may be used to further separate a control plane (CP) and a user plane (UP). The control plane of the CU (CU-CP) and the user plane of the CU (CU-UP) may be implemented by different function entities, and the CU-CP and the CU-UP may be coupled to the DU to jointly implement a function of the base station.

It may be understood that embodiments provided in this application are also applicable to an architecture in which the CU and the DU are not separated.

In this application, the network device may be any device having a wireless transceiver function. The network device includes but is not limited to: an evolved NodeB (NodeB or eNB or e-NodeB, evolved Node B) in LTE, a base station (gNodeB or gNB) or a transmission reception point (TRP) in NR, a base station that subsequently evolves in 3GPP, an access node in a Wi-Fi system, a wireless relay node, a wireless backhaul node, a core network device, and the like. The base station may be a macro base station, a micro base station, a picocell base station, a small cell, a relay station, a balloon station, or the like. A plurality of base stations may support networks using a same technology mentioned above, or may support networks using different technologies mentioned above. The base station may include one or more co-site or non-co-site TRPs. The network device may further be a server (for example, a cloud server), a radio controller in a cloud radio access network (CRAN) scenario, a CU, and/or a DU. The network device may alternatively be a server, a wearable device, a machine type communication device, a vehicle-mounted device, a smart screen, or the like. An example in which the network device is a base station is used for description below. The plurality of network devices may be base stations of a same type or base stations of different types. The base station may communicate with a terminal device, or may communicate with the terminal device through a relay station. The terminal device may communicate with a plurality of base stations using different technologies. For example, the terminal device may communicate with a base station supporting an LTE network, or may communicate with a base station supporting a 5G network, or may support dual connections to the base station supporting the LTE network and the base station supporting the 5G network.

The terminal is a device with a wireless transmitting/receiving function. The terminal may be deployed on land, indoor or outdoor, or may be hand-held, wearable or vehicle-mounted; may be deployed on a water surface (for example, on a ship); or may be deployed in the air (for example, on an airplane, a balloon, or a satellite). The terminal may be a mobile phone, a tablet computer (Pad), a computer having a wireless transceiver function, a VR terminal device, an AR terminal device, an MR terminal device, a terminal in industrial control, a vehicle-mounted terminal device, a terminal in self driving, a terminal in assisted driving, a terminal in telemedicine, a terminal in a smart grid, a terminal in transportation safety, a terminal in a smart city, a terminal in a smart home, or the like. Application scenarios are not limited in embodiments of this application. Sometimes, the terminal may also be referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a wireless communication device, a machine terminal, a UE agent, a UE apparatus, or the like. The terminal may be fixed or mobile.

By way of example and not limitation, the terminal in this application may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on a body or integrated into clothes or an accessory of a user. The wearable device is not merely a hardware device, and further implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In this application, the terminal may be a terminal in an internet of things (IoT) system. IoT is an important component in development of future information technologies. A main technical feature of the IoT is to connect an object to a network by using a communication technology, to implement an intelligent network of human-machine interconnection and thing-thing interconnection. The terminal in this application may be a terminal in machine type communication (MTC). The terminal in this application may be a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted component, the vehicle-mounted chip, or the vehicle-mounted unit that is built in the vehicle, to implement a method in this application. Therefore, embodiments of this application may be applied to the internet of vehicles, for example, vehicle to everything (V2X), long term evolution-vehicle (LTE-V), or vehicle-to-vehicle (V2V).

Alternatively, the terminal in this application may be a VR terminal, an AR terminal, or an MR terminal. The VR terminal, the AR terminal, and the MR terminal may all be referred to as XR terminals. The XR terminal may be, for example, a head mounted device (for example, a helmet or glasses), may be an all-in-one machine, or may be a television, a display, a car, a vehicle-mounted device, a tablet, or a smart screen. The XR terminal can present XR data to a user, and the user can experience diversified XR services by wearing or using the XR terminal. The XR terminal may access a network in a wireless or wired manner, for example, by using a Wi-Fi or 5G system.

The XR technology has advantages such as multi-view and strong interaction, can provide brand-new visual experience for the user, and has great application value and business potential. The XR includes technologies such as VR, AR, and MR, and can be widely applied to various fields such as entertainment, gaming, healthcare, advertising, industry, online education, and engineering. The VR technology mainly refers to rendering visual and audio scenarios to simulate sensory stimulation of vision and audio in the real world to a user as much as possible. The VR technology usually requires the user to wear an XR terminal (for example, a head mounted device) to simulate vision and/or hearing of the user. The VR technology may further perform action tracking on the user, to update simulated visual and/or auditory content in time. The AR technology mainly refers to providing additional visual and/or auditory information or manually generated content in a real environment perceived by a user. The user may directly (where for example, sensing, processing, and rendering is not performed) or indirectly (where for example, transfer is performed in a manner such as using a sensor) perceive the real environment, and further enhancement processing is performed. The MR technology is to insert some virtual elements into a physical scenario, to provide a user with immersive experience in which these elements are part of the real scenario. The network device may process and transmit data (which may be referred to as XR data) generated in the XR service. For example, a network device in a cloud may perform rendering and encoding (for example, source coding) on source XR data, and transmit the XR data to an XR terminal by using a network device in a core network and/or an access network. The XR terminal provides diversified XR experience (for example, immersive experience, visual experience, interaction experience, or device experience) for the user by processing the XR data. The XR experience may be evaluated from a plurality of different dimensions, for example, including one or more of the following dimensions: image definition, image smoothness, image distortion, image stereoscopy, image black borders, image smearing, sound quality, sound effect, angle of view, freezing, artifacts, dizziness, audio and video synchronization, interaction freedom, interaction operation response speed, interaction operation precision, interaction content loading speed, terminal wearing comfort, terminal wearing fatigue, terminal battery life, terminal portability, terminal visual impairment friendliness, or the like.

Figure 3:
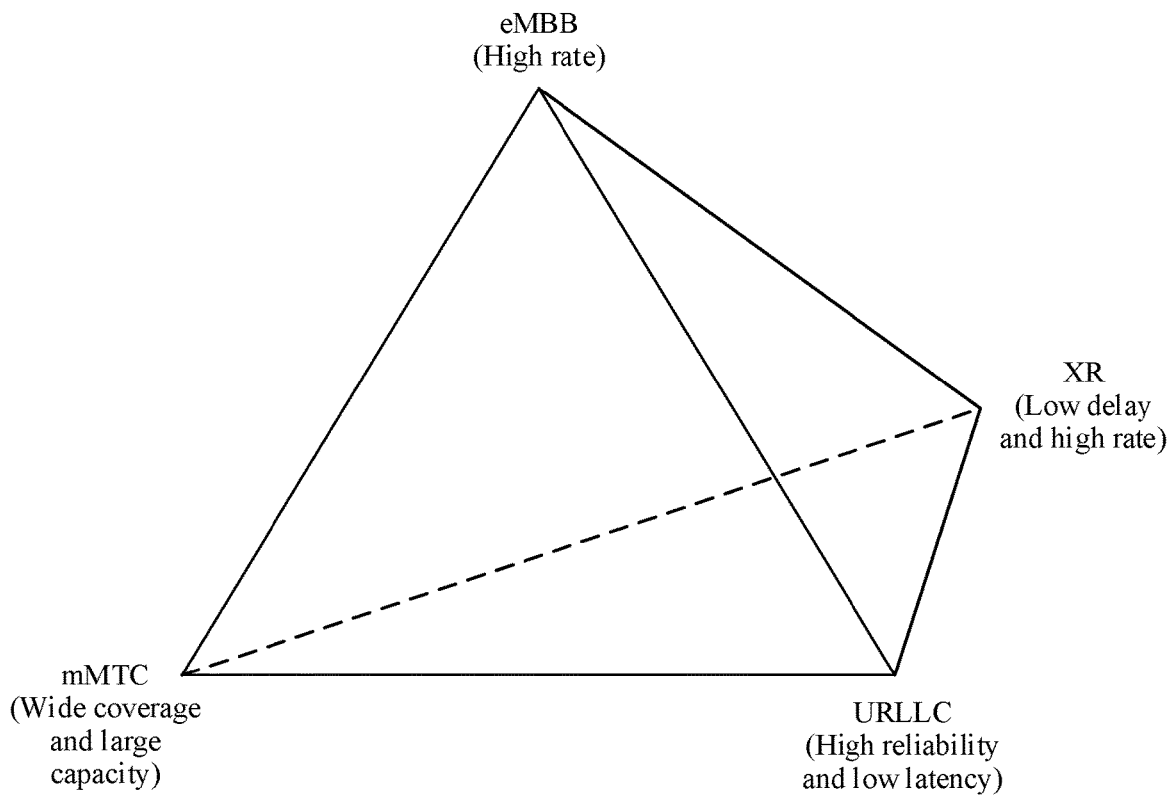
FIG. 3 is a diagram of four service requirements.

The data of the XR service includes one or more of VR data, AR data, MR data, video data, audio data, or picture data. A data transmission requirement of the XR service is different from data transmission requirements of an enhanced mobile broadband (eMBB) service, a massive machine type communication (mMTC) service, and an ultra-reliable low-latency communication (URLLC) service. FIG. 3 is a diagram of four service requirements. FIG. 3 shows a triangular pyramid. Four vertices of the triangular pyramid respectively represent focuses of data transmission requirements of the eMBB service, the mMTC service, the URLLC service, and the XR service. Different vertices represent different focuses of data transmission requirements of different services. The XR service may also be considered as a fourth-type service in a post-5G or 6G communication system, and may be referred to as a fourth-pole service for short. The eMBB service has a high requirement on a data rate, the mMTC service has a high requirement on coverage and a capacity, and the URLLC service has a high requirement on a latency and reliability. However, the XR service has a requirement for a low delay and a high rate, and whether the requirement of the XR service is met is generally determined depending on user experience. For example, when transmission of the XR data has a large delay or a low rate, the user may feel dizzy in viewing, resulting in poor visual experience of the user. However, user experience of network transmission of the XR data is a subjective feeling of the user, and impact on the XR data during network transmission cannot be accurately and objectively measured, so that a network operator cannot be systematically helped to perform network optimization for the XR data. Therefore, how to measure the impact on the XR data during network transmission more systematically and objectively to guide the network operator to optimize the network based on the XR data becomes an urgent problem to be resolved.

An embodiment of this application provides a quality indication method for XR data transmission. In this method, transmission quality of the XR data is determined based on a performance parameter that can be obtained from a network. Objective impact on the XR data in network transmission can be systematically evaluated by using the method, to guide a network operator to maintain and optimize the network based on a requirement of the XR data.

The following describes the technical solutions of this application in detail by using embodiments with reference to the accompanying drawings. The following embodiments and implementations may be combined with each other, and same or similar concepts or processes may not be described again in some embodiments. It should be understood that a function explained in this application may be implemented by using an independent hardware circuit, software running in combination with a processor/microprocessor or a general-purpose computer, an application-specific integrated circuit, and/or one or more digital signal processors. When described as a method, this application may alternatively be implemented in a computer processor and a memory coupled to the processor.

For ease of understanding of embodiments of this application, some concepts or terms used in this application are first briefly described.

1. Mean Opinion Score (MOS)

The MOS (also referred to as a subjective average score or subjective evaluation opinion score) is a subjective quantitative method for evaluating voice quality. The MOS reflects a subjective perception of voice quality of the user. For example, a possible MOS in a 5-point scale is shown in Table 1.

TABLE 1

| Voice quality | MOS |
|---|---|
| Excellent | 5 |
| Good | 4 |
| Accept | 3 |
| Poor | 2 |
| Bad | 1 |

2. Perceptual Objective Listening Quality Analysis (POLQA)

The POLQA is a process-based voice quality measurement method that uses professional instruments to evaluate voice quality and obtain an evaluation conclusion.

3. Voice Quality Indicator (VQI)

The VQI (which may also be referred to as a voice quality indicator) is a voice quality evaluation method based on parameter estimation, and can obtain a voice quality score by calculating a main factor that affects voice quality. For example, a VQI value is obtained based on a frame error rate of voice data, to evaluate the voice quality.

4. Video Multi-Method Assessment Fusion (VMAF)

The VMAF (which may also be referred to as video multi-dimensional assessment fusion) may fuse multi-dimensional indicators (for example, a distortion degree and a distortion type) related to a video source, and obtain an assessment on video quality by using machine learning or an artificial intelligence algorithm. The VMAF can allocate a certain weight to each indicator in the multi-dimensional indicators, to reflect an advantage proportion of each indicator in the final evaluation, to obtain a more accurate evaluation score.

5. Cloud Extended Reality (Cloud XR)

The cloud XR (which may also be referred to as cloudification of XR) means that technologies such as cloud computing and cloud rendering are introduced into an application of the XR service, and a display output, a sound output, and the like of the cloud are encoded and compressed and then transmitted to an XR terminal by using a network.

Figure 4:
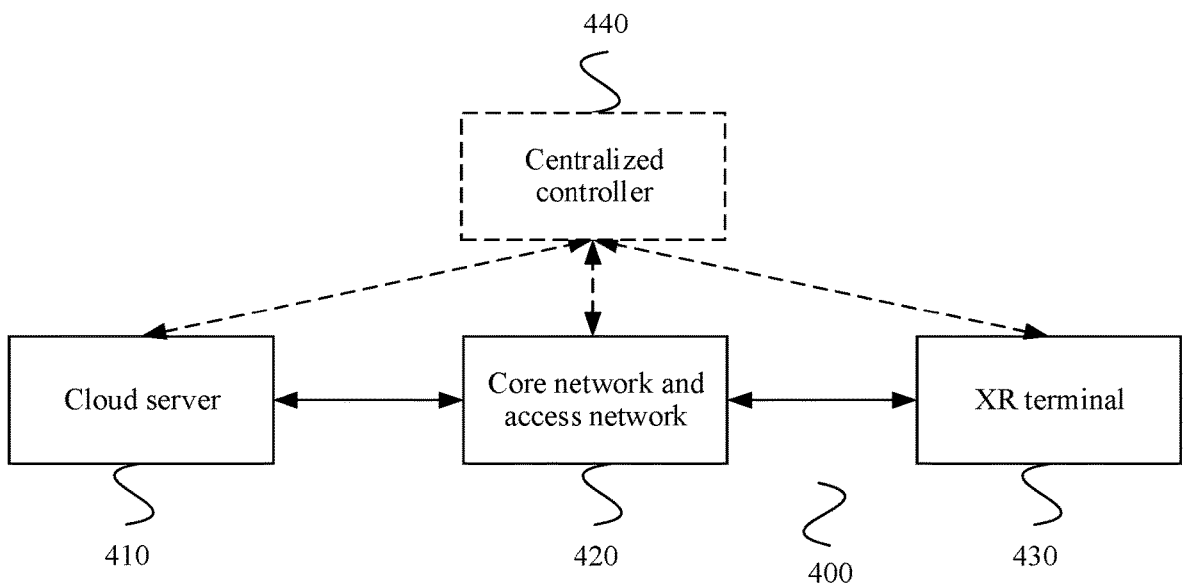
FIG. 4 to FIG. 6 are diagrams of several system architectures applicable to embodiments of this application.
Figure 5:
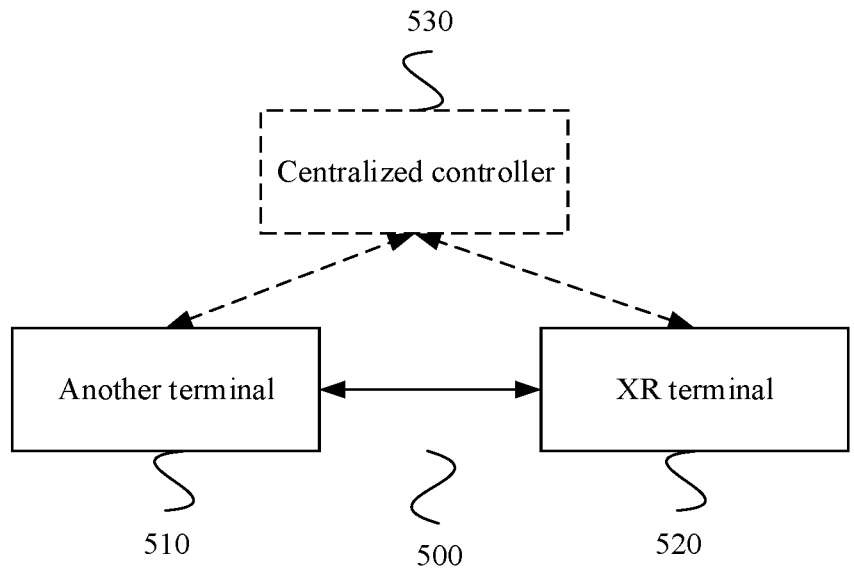
Figure 6:
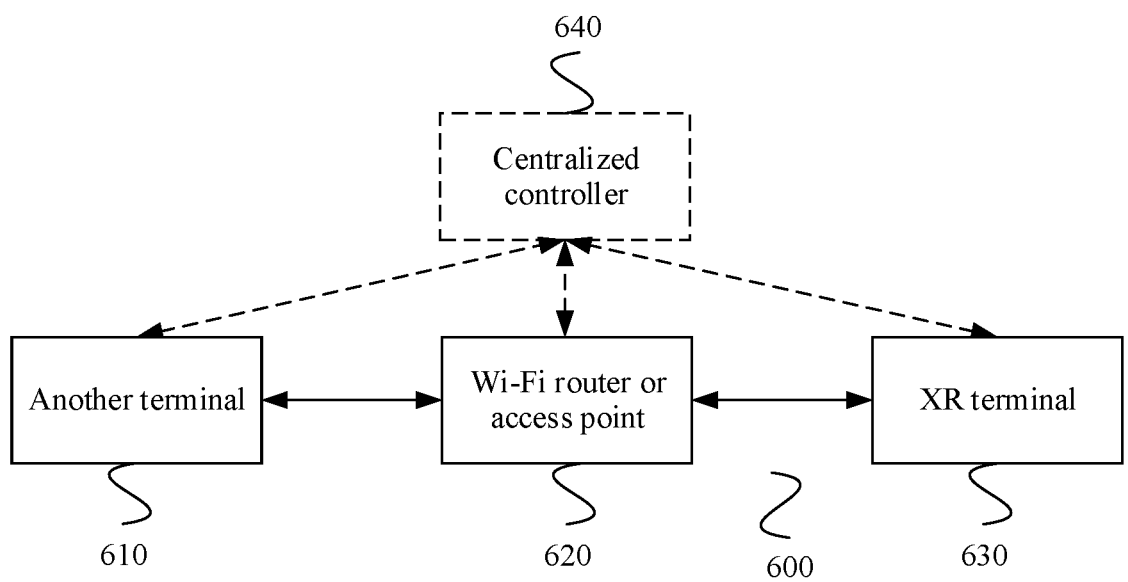

Embodiments provided in this application are applicable to a plurality of different scenarios. FIG. 4 to FIG. 6 are diagrams of several system architectures applicable to embodiments of this application.

FIG. 4 is a diagram of a system network element applicable to an embodiment of this application. FIG. 4 shows a system 400, including a cloud server 410, a core network and access network 420 (which may be referred to as a transmission network 420 for short, for example, an LTE, a 5G, or a 6G network), and an XR terminal 430. The cloud server 410 may be configured to encode, decode, and render source XR data, the transmission network 420 may be configured to transmit XR data, and the XR terminal 430 provides diversified XR experience for a user by processing the XR data. It may be understood that another apparatus, for example, another terminal (for example, a mobile phone, a notebook computer, or a car) and/or a network device (for example, a relay, a Wi-Fi router, or a Wi-Fi access point), may be further included between the transmission network 420 and the XR terminal 430. The XR terminal 430 obtains the XR data from the transmission network 420 by using the another terminal and/or the network device. Optionally, the system 400 further includes a centralized controller 440. The centralized controller 440 may receive/collect data from one or more of the cloud server 410, the transmission network 420, or the XR terminal 430, or may send data to one or more of the cloud server 410, the transmission network 420, or the XR terminal 430. It may be understood that the centralized controller 440 may be deployed independently of the cloud server 410, the transmission network 420, and the XR terminal 430, or may be deployed in the cloud server 410, the transmission network 420, or the XR terminal 430. Alternatively, the centralized controller 440 may not be deployed, but the cloud server 410, the transmission network 420, or the XR terminal 430 implements a function of the centralized controller 440.

FIG. 5 is a diagram of another system network element applicable to an embodiment of this application. FIG. 5 shows a system 500, including an XR terminal 520 and another terminal 510. The another terminal 510 is a terminal other than the XR terminal 520, and the another terminal 510 may be an XR terminal, or may be an ordinary terminal (which may also be referred to as a non-XR terminal). The another terminal 510 may transmit XR data to the XR terminal 520. Optionally, the system 500 further includes a centralized controller 530. The centralized controller 530 may receive/collect data from the XR terminal 520 and/or the another terminal 510, or may send data to the XR terminal 520 and/or the another terminal 510. It may be understood that the centralized controller 530 may be deployed independently of the XR terminal 520 and the another terminal 510, or may be deployed in the XR terminal 520 or the another terminal 510. Alternatively, the centralized controller 530 may not be deployed, but the XR terminal 520 or the another terminal 510 implements a function of the centralized controller 530.

FIG. 6 is a diagram of another system network element applicable to an embodiment of this application. FIG. 6 shows a system 600, including an XR terminal 630, a Wi-Fi router or Wi-Fi access point 620 (which may be referred to as a Wi-Fi apparatus 620 for short), and another terminal 610. The another terminal 610 is a terminal other than the XR terminal 630, and the another terminal 610 may be an XR terminal, or may be an ordinary terminal (which may also be referred to as a non-XR terminal). The another terminal 610 may transmit XR data to the XR terminal 630 by using the Wi-Fi apparatus 620. Optionally, the system 600 further includes a centralized controller 640. The centralized controller 640 may receive/collect data from one or more of the another terminal 610, the Wi-Fi apparatus 620, or the XR terminal 630, or may send data to one or more of the another terminal 610, the Wi-Fi apparatus 620, or the XR terminal 630. It may be understood that the centralized controller 640 may be deployed independently of the another terminal 610, the Wi-Fi apparatus 620, and the XR terminal 630, or may be deployed in the another terminal 610, the Wi-Fi apparatus 620, or the XR terminal 630. Alternatively, the centralized controller 640 may not be deployed, but the another terminal 610, the Wi-Fi apparatus 620, or the XR terminal 630 implements a function of the centralized controller 640.

Figure 7A:
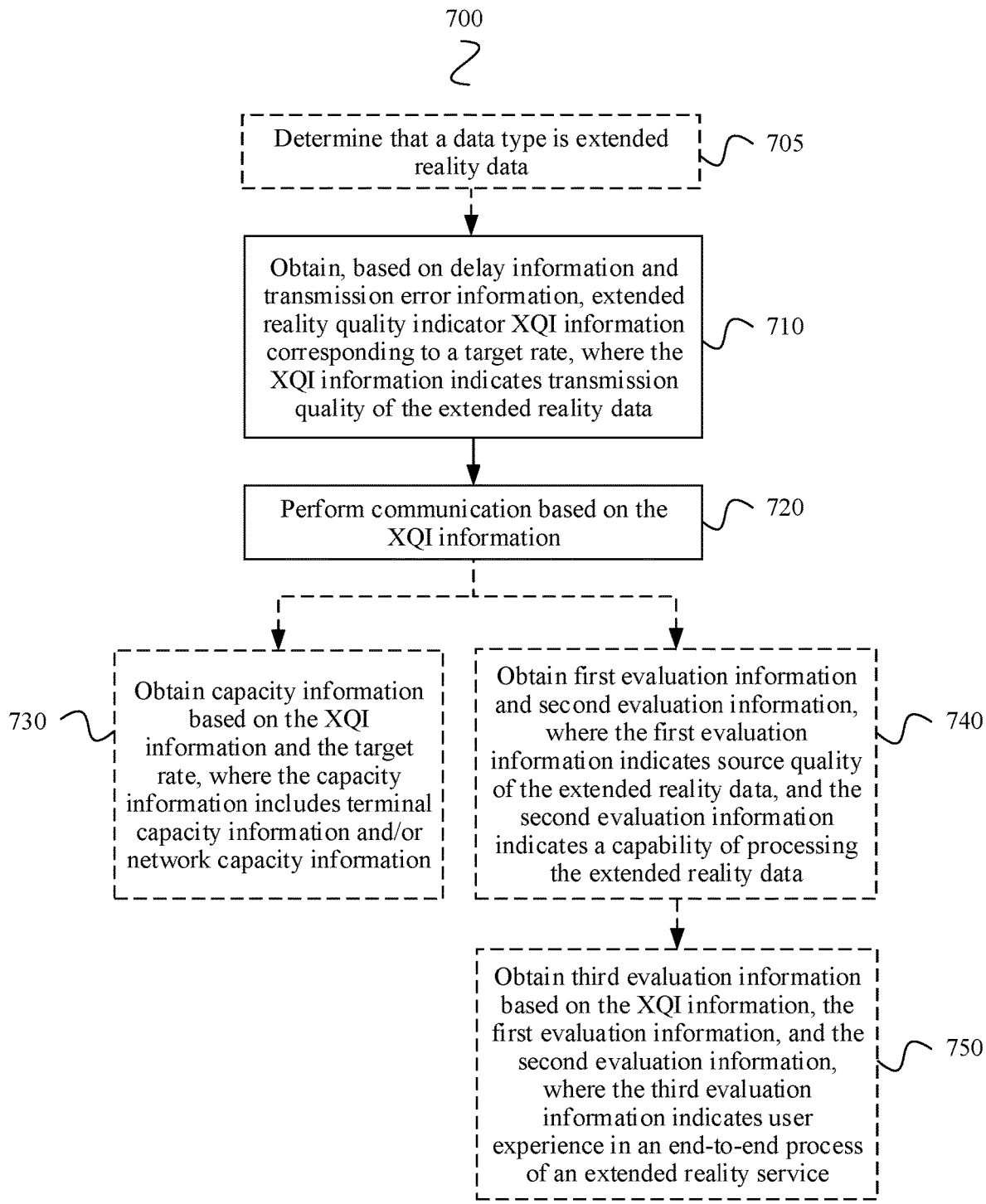
FIG. 7A, FIG. 7B, FIG. 8, and FIG. 9 are flowcharts of several communication methods according to embodiments of this application.

FIG. 7A is a flowchart of a communication method 700 according to an embodiment of this application. The method may be executed by a terminal (for example, an XR terminal), or may be executed by a chip, a chip system, a processor, or the like that supports the terminal in implementing the method. The method may be executed by a network device (for example, a core network device, an access network device, a Wi-Fi router, or a Wi-Fi access point), or may be executed by a chip, a chip system, a processor, or the like that supports the network device in implementing the method. The method may be executed by a server (for example, a cloud server), or may be executed by a chip, a chip system, a processor, or the like that supports the server in implementing the method. The method may be executed by a centralized controller, or may be executed by a chip, a chip system, a processor, or the like that supports the centralized controller in implementing the method. Execution bodies of parts in FIG. 7A may be the same or may be different. As shown in FIG. 7A, the method 700 in this embodiment may include a part 710 and a part 720.

Part 710: Obtain, based on delay information and transmission error information, extended reality quality indicator (XR quality data indicator/index, XQI) information corresponding to a target rate, where the XQI information indicates an XQI, and the XQI represents transmission quality of XR data. The XQI information corresponding to the target rate may also be understood as that the XQI indicated by the XQI information corresponds to the target rate. The XQI may also be referred to as a network transmission MOS, a network user experience indicator, or the like. This is not limited in the present application. The XQI represents transmission quality of the XR data in a network, and the network includes a core network and/or an access network. The delay information and the transmission error information may be delay information and transmission error information corresponding to the core network, or may be delay information and transmission error information corresponding to the access network, or may be delay information and transmission error information corresponding to the core network and the access network. Therefore, the XQI can reflect impact on transmission of the XR data in the core network and/or the access network, that is, can reflect quality of user experience on the XR service.

Part 720: Perform communication based on the XQI information. In an implementation, the performing communication based on the XQI information may be implemented as: outputting the XQI information. For example, an execution body that executes the method 700 may send the obtained XQI information to another network element in a system through a communication interface. For another example, an execution body that executes the method 700 may output, through a communication interface, the obtained XQI information to another component in a network element in which the execution body is located. In another implementation, the performing communication based on the XQI information may be implemented as: sending or receiving the XR data based on the XQI information.

Because the XQI information can represent transmission quality of the XR data in a network, objective impact on the XR data in network transmission can be systematically evaluated by using the method, to guide a network operator to maintain and optimize the network based on a requirement of the XR data.

In the part 710, optionally, the delay information includes packet delay budget (PDB) information and/or delay variation information. The PDB information indicates a PDB, and the PDB indicates how long a data packet needs to be correctly transmitted. The delay variation information indicates a change of a delay. For example, if the PDB information indicates that the PDB is 10 milliseconds (ms), it indicates that the data packet needs to be correctly transmitted within 10 ms.

In the part 710, optionally, the delay information further includes packet average delay information and/or delay variance information. The average delay information indicates an average value of the delay or the PDB in a period of time. The delay variance information indicates a variance of the delay.

In the part 710, optionally, the transmission error information includes one or more of packet error rate (PER) information, block error rate (BLER) information, retransmission information, average packet loss rate information, burst packet loss rate information, or first packet response time information. The PER (which may also be referred to as a packet error rate) information indicates a ratio of a quantity of incorrectly received data packets to a total quantity of received data packets. The BLER information indicates a ratio of a quantity of incorrectly received data blocks to a total quantity of received data blocks. The retransmission information may indicate, for example, a quantity of hybrid automatic repeat request (HARQ) retransmission times, or acknowledgment response (ACK) or negative acknowledgment response (NACK) information reported by a terminal device to a base station. The average packet loss rate information may indicate a rate of packet loss in a period of time. The burst packet loss rate information may indicate a packet loss rate of a burst service from the beginning to the end. The first packet response time information may indicate time from starting to send the first packet to receiving an acknowledgment response (ACK) for the packet.

In the part 710, optionally, the target rate includes a source rate and/or a network transmission rate of the XR data.

The source rate of the XR data may be understood as a data rate of an XR video source and/or audio source, or may be understood as a data output rate of the XR video source and/or audio source at a source end. For example, a source rate of 4K quality (4K resolution) XR data is 60 megabits per second (Mbps), and a source rate of 8K quality (8K resolution) XR data is 120 Mbps. The source rate of the XR data varies with a frame rate and an XR video compression rate. After receiving the XR data, an XR terminal decodes and performs corresponding processing on the received XR data, and then outputs the XR data to an output apparatus at a specific rate (which may also be understood as a data output rate of the XR data on the terminal) to present the XR data to a user in a form of video and/or audio. When the data output rate of the XR data on the terminal can match a data output rate of a source end (for example, the data output rate of the XR data on the terminal is greater than or equal to the data output rate of the source end), the output apparatus of the XR terminal can restore, on the terminal side, the resolution of the XR video source and/or audio source at the source end. For example, when the data output rate of the XR data on the terminal can reach 60 Mbps, 4K quality XR data can be restored on the terminal side. For another example, when the data output rate of the XR data on the terminal can reach 120 Mbps, 8K quality XR data can be restored on the terminal side.

The network transmission rate may be understood as a transmission rate of data in an access network. The XQI information corresponding to the target rate in the part 710 may be understood as XQI information at a given target rate. When the XQI information corresponding to the target rate is obtained based on the delay information and the transmission error information, the XQI information may be obtained with reference to the target rate, or may not be obtained with reference to the target rate. This is not limited in this application. The network transmission rate affects an output effect of the XR data on the XR terminal. For example, when the network transmission rate is low, even if the XR terminal can restore the resolution of the XR video source and/or audio source at the source end, freezing and artifacts may occur in the XR data output by the XR terminal, and affect user experience.

The XQI information corresponding to the target rate is reflected by using the foregoing delay information and transmission error information that represent objective impact on network transmission, so that a more flexible indicator can be provided for transmission quality of the XR data in the network, to provide a controllable and quantifiable evaluation basis for network maintenance and optimization based on an XR data requirement.

In the method 700, the obtaining, based on delay information and transmission error information, XQI information corresponding to a target rate may be: obtaining, based on the delay information and the transmission error information, an XQI corresponding to the target rate. In this case, the XQI may satisfy the following formula:

$$XQI = f1(\text{delay information, transmission error information}), \text{ where}$$

"f1(delay information, transmission error information)" represents a function f1 using the delay information and the transmission error information as independent variables. For example, the XQI may satisfy the following formula:

$$XQI = f1(\text{delay information, transmission error information}) = K - f2(\text{delay information, transmission error information}), \text{ where}$$

K represents a highest evaluation score (for example, 5) for evaluating XR data transmission quality, f2(delay information, transmission error information) represents a loss score (for example, a real number value greater than or equal to 0 and less than or equal to 5) of network transmission, and the loss score is represented by the function f2 using the delay information and the transmission error information as independent variables.

Optionally, the XQI information (or an XQI indicated by the XQI information) may alternatively be obtained based on the source rate, the network transmission rate, the delay information, and the transmission error information of the XR data. For example, when the network transmission rate is greater than or equal to the source rate of the XR data, the XQI is obtained according to the foregoing method. For example:

$XQI=f1$(delay information, transmission error information), or $XQI=f1$(delay information, transmission error information)$=K-f2$(delay information, transmission error information).

When the network transmission rate is less than the source rate of the XR data, the network transmission rate is also used as a factor affecting the XQI, to determine the XQI information with reference to the delay information and the transmission error information. For example, the XQI may satisfy the following formula:

$XQI=f1$(delay information, transmission error information, network transmission rate), or $XQI=f1$(delay information, transmission error information, network transmission rate)$=K-f2$(delay information, transmission error information, network transmission rate), where "f1(delay information, transmission error information, network transmission rate)" represents a function f1 using the delay information, the transmission error information, and the network transmission rate as independent variables. K represents a highest evaluation score (for example, 5) for evaluating XR data transmission quality, f2(delay information, transmission error information, network transmission rate) represents a loss score (for example, a real number value greater than or equal to 0 and less than or equal to 5) of network transmission, and the loss score is represented by the function f2 using the delay information, the transmission error information, and the network transmission rate as independent variables.

Optionally, there is a correspondence between a value range of the XQI and transmission quality of the XR data and/or user experience of the XR service. User experience of the XR service may be evaluated, for example, by using one or more of the following indicators: image definition, image smoothness, image distortion, image stereoscopy, image black borders, image smearing, sound quality, sound effect, angle of view, freezing, artifacts, dizziness, audio and video synchronization, interaction freedom, interaction operation response speed, interaction operation precision, or content loading speed.

For example, Table 2 shows a transmission quality level of the XR data and a level of user experience on the XR service that correspond to an XQI value range. A larger XQI value indicates better transmission quality of the XR data and better user experience on the XR service. It may be understood that the value range in Table 2 is merely an example, and the value range in Table 2 is not limited in this application.

TABLE 2

| Transmission quality of XR data | XQI value range | User experience on the XR service |
|---|---|---|
| Excellent | XQI > 4.0 | Very satisfied |
| Good | 4.0 ≥ XQI > 3.0 | Satisfied |
| Accept | 3.0 ≥ XQI > 2.0 | Average |
| Poor | 2.0 ≥ XQI > 1.0 | Unsatisfied |
| Bad | 1.0 ≥ XQI | Very unsatisfied |

For another example, Table 3 shows another transmission quality level of the XR data and another level of user experience on the XR service that correspond to an XQI value range. A smaller XQI value indicates better transmission quality of the XR data and better user experience on the XR service. It may be understood that the value range in Table 3 is merely an example, and the value range in Table 3 is not limited in this application.

TABLE 3

| Transmission quality of XR data | XQI value range | User experience on the XR service |
|---|---|---|
| Excellent | 1.0 ≥ XQI | Very satisfied |
| Good | 2.0 ≥ XQI > 1.0 | Satisfied |
| Accept | 3.0 ≥ XQI > 2.0 | Average |
| Poor | 4.0 ≥ XQI > 3.0 | Unsatisfied |
| Bad | XQI > 4.0 | Very unsatisfied |

For another example, the XQI value range may also be real numbers ranging from 0 to 100. If the XQI is greater than 90, it indicates that user experience is very satisfied; if the XQI is greater than 70 and less than or equal to 90, it indicates that user experience is satisfied; and so on, as shown in the example in Table 4.

TABLE 4

| Transmission quality of XR data | XQI value range | User experience on the XR service |
|---|---|---|
| Excellent | XQI > 90 | Very satisfied |
| Good | 90 ≥ XQI > 70 | Satisfied |
| Accept | 70 ≥ XQI > 50 | Average |
| Poor | 50 ≥ XQI > 30 | Unsatisfied |
| Bad | 30 ≥ XQI | Very unsatisfied |

In the part 710 of the method 700, the obtaining, based on delay information and transmission error information, XQI information corresponding to a target rate may also be understood as that there is a correspondence between the XQI and a delay value indicated by the delay information and a transmission error rate indicated by the transmission error information.

For example, Table 5 shows a possible correspondence between the XQI and the delay information and the transmission error information. 0 ms, 5 ms, 10 ms, 15 ms, and 20 ms in the first row of Table 5 represent five possible delay values (for example, a PDB) that may be indicated by the delay information, and 0%, 0.01%, 0.02%, 0.03%, 0.04%, 0.05%, 0.1%, and 0.2% in the first column of Table 5 represent eight possible transmission error rates (for example, PERs) that may be indicated by the transmission error information. Other values in Table 5 represent XQI values. It can be learned from Table 5 that one XQI corresponds to one delay value and one transmission error rate. For example, when a transmission error rate=0.02%, and a delay value=10 ms, a corresponding XQI=3.5118. For example, the XQI values in Table 5 may be obtained by using a method of MOS, POLQA, VQI, or VMAF, or may be obtained by using a combination of two or more methods in the MOS, POLQA, VQI, and VMAF, or may be obtained by using another method. This is not limited in this application. It may be understood that the values in Table 5 are merely examples, and the values in Table 5 are not limited in this application.

TABLE 5

|       | 0 ms   | 5 ms   | 10 ms  | 15 ms  | 20 ms  |
|-------|--------|--------|--------|--------|--------|
| 0%    | 5      | 5      | 5      | 4.6976 | 4.364  |
| 0.01% | 4.1846 | 4.1846 | 4.1846 | 3.9744 | 3.7426 |
| 0.02% | 3.5118 | 3.5118 | 3.5118 | 3.3017 | 3.0698 |
| 0.03% | 2.9567 | 2.9567 | 2.9567 | 2.7466 | 2.5147 |
| 0.04% | 2.4988 | 2.4988 | 2.4988 | 2.2886 | 2.0568 |
| 0.05% | 2.1209 | 2.1209 | 2.1209 | 1.9108 | 1.6789 |
| 0.10% | 1.0202 | 1.0202 | 1.0202 | 1      | 1      |
| 0.20% | 1      | 1      | 1      | 1      | 1      |

Optionally, when the network transmission rate is greater than or equal to the source rate of the XR data, there is a correspondence between the XQI and the delay information and the transmission error information (for example, the correspondence shown in Table 5). When the network transmission rate is less than the source rate of the XR data, there is a correspondence between the XQI and the delay information, the transmission error information, and the network transmission rate.

It may be understood that the correspondence between the XQI and the delay value and the transmission error rate may be alternatively represented by using a function. For example, the correspondence shown in Table 5 is used as an example, where x represents the delay value indicated by the delay information, y represents the transmission error rate indicated by the transmission error information, and the XQI satisfies the following formula:

$$XQI=(p1+p3*x+p5*y+p7*x^2+p9*y^2+p11*x*y)/(1+p2*x+p4*y+p6*x^2+p8*y^2+p10*x*y), \text{ where}$$

$p1=4.95812, p2=-0.00728, p3=-0.01195, p4=6.03596, p5=-50.5809, p6=0.000212, p7=-0.0014729, p8=59.1871, p9=238.6637, p10=0.01589, \text{ and } p11=0.25696.$ Optionally, the XQI information in the method 700 corresponds to a first extended reality data stream and a second extended reality data stream, where the XQI information includes first XQI information and second XQI information, the first XQI information corresponds to the first extended reality data stream, and the second XQI information corresponds to the second extended reality data stream. It may also be understood as that XQIs included in the XQI information correspond to a first extended reality data stream and a second extended reality data stream, where the XQIs include a first XQI and a second XQI, the first XQI corresponds to the first extended reality data stream, and the second XQI corresponds to the second extended reality data stream. The first extended reality data stream and the second extended reality data stream may be one of the following cases.

The first extended reality data stream includes an extended reality base layer data stream, and the second extended reality data stream includes an extended reality enhancement layer data stream. The extended reality base layer data stream and the extended reality enhancement layer data stream may be extended reality data streams obtained by coding source data of the XR. The coding may be, for example, high efficiency video coding (HEVC) or scalability extension of HEVC (SHVC).

The first extended reality data stream includes an extended reality in-field of view (FOV) data stream, and the second extended reality data stream includes an extended reality out-of-FOV data stream. The extended reality in-FOV data stream and the extended reality out-of-FOV data stream may be extended reality data streams obtained by performing FOV source coding on the source data of the XR. The FOV source coding may divide the source data of the XR into an in-view part and an out-of-view part. Generally, a view angle of the FOV is about 60 degrees to 150 degrees. The in-view part corresponds to the extended reality in-FOV data stream, and the out-of-view part corresponds to the extended reality out-of-FOV data stream.

XQIs are independently allocated to different extended reality data streams, so that extended reality data with different transmission requirements can be differentiated. Different transmission policies are separately used for an extended reality data stream with a higher priority and an extended reality data stream with a lower priority, so that XR data can be transmitted more efficiently by using limited network resources.

It may be understood that the first extended reality data stream and the second extended reality data stream are merely two extended reality data streams used as examples to describe the implementation. A quantity of extended reality data streams is not limited in this application, and the quantity of the extended reality data streams may also be three or more. Correspondingly, the first XQI and the second XQI are merely two XQIs used as examples to describe the implementation. A quantity of XQIs corresponding to the extended reality data stream is not limited in this application, and the quantity of the XQIs corresponding to the extended reality data stream may also be three or more. For example, the XQI information in the method 700 may further include third XQI information corresponding to a third extended reality data stream, or it may be understood that the XQI information may further include a third XQI corresponding to a third extended reality data stream.

The method 700 may further include an optional part 730: obtaining capacity information based on the XQI information and the target rate. Optionally, the capacity information includes terminal capacity information and/or network capacity information.

The terminal capacity information may be understood as an equivalent capacity of the terminal at a given target rate. For example, for a terminal i, an example in which the target rate is Ci and the XQI information indicates that an XQI of the terminal i is an $XQI_i$ is used. An equivalent capacity $C_{eff,i}$ of the terminal i may satisfy one of the following formulas:

$$C_{eff,i}=k_i*C_i*XQI_i, \text{ or}$$

$$C_{eff,i}=k_i*C_i*\log(XQI_i), \text{ where}$$

$k_i$ is a coefficient greater than 0, and $k_i$ may be predefined, or may be configured by a network. log(XQI) represents a logarithm with base 10 or 2 of the XQI.

The network capacity information may be understood as an equivalent capacity of the network when all terminals in the network are considered. For example, a network includes I terminals. An equivalent capacity of terminal i ($1 \leq i \leq I$) is $C_{eff,i}$, and an equivalent capacity $C_{eff,N}$ of the network may satisfy one of the following formulas:

$$C_{eff,N}=C_{eff,1}+C_{eff,2}+ \ldots +C_{eff,i}+ \ldots +C_{eff,I-1}+C_{eff,I},$$
or $$C_{eff,N}=w_1*C_{eff,1}+w_2*C_{eff,2}+ \ldots +w_i*C_{eff,i}+ \ldots +w_{I-1}*C_{eff,I-1}+w_I*C_{eff,I}, \text{ where}$$

$w_i$ represents a weighting coefficient corresponding to the terminal i, and $w_i$ may be a real number greater than or equal to 0 and less than or equal to 1.

In another manner of evaluating the network capacity information, for a terminal or a user included in a network, statistics may be collected on distribution of an XQI of the terminal or the user, for example, a cumulative distribution function (CDF) of the XQI, to measure performance of supporting the XR service by the network. For example, in the CDF of the XQI, a proportion of terminals or users corresponding to the XQI may be obtained. For example, a larger XQI indicates better user experience. If a proportion of terminals or users corresponding to a large XQI is high, the network supports the XR service well. If a proportion of terminals or users corresponding to a small XQI is high, the network supports the XR service poorly.

The capacity information is obtained based on the XQI information and the target rate, so that an overall network capacity can be quantitatively evaluated, and the network operator can be guided to adapt the network resource based on a capacity requirement of the XR data, to use the network resource more efficiently.

The method 700 may further include an optional part 740 and an optional part 750.

Part 740: Obtain first evaluation information and second evaluation information, where the first evaluation information indicates source quality of the XR data, and the second evaluation information indicates a capability of processing the XR data. The source quality of the XR data may be used to evaluate one or more of the following indicators of the XR video source and/or audio source: image quality definition, image smoothness, image stereoscopy, image distortion, frame rate, audio quality, or rendering effect. The capability of processing the XR data may be used to evaluate a capability of an XR terminal to process and/or display the XR data, for example, a supported FOV angle and/or refresh rate. The capability of processing the XR data may be further used to evaluate one or more of indicators such as a battery life, wearing comfort, wearing fatigue, portability, or visual impairment friendliness of the XR terminal. Optionally, the first evaluation information and the second evaluation information may be obtained by using a method of MOS, POLQA, VQI, or VMAF, or may be obtained by using a combination of two or more methods in the MOS, POLQA, VQI, and VMAF, or may be obtained by using another method. This is not limited in this application.

Part 750: Obtain third evaluation information based on the XQI information, the first evaluation information, and the second evaluation information, where the third evaluation information indicates user experience in an end-to-end process of an XR service, and the end-to-end process includes generation of the XR data, transmission of the XR data, and processing of the XR data. The first evaluation information indicates source quality of the XR data, and may be understood as evaluating quality (namely, source quality) when the XR data is generated. The second evaluation information indicates a capability of processing the XR data, and may be understood as evaluating an indicator (namely, end quality) of the XR terminal when processing the XR data. The XQI information represents transmission quality of the XR data, and may be understood as evaluating transmission quality (namely, pipe quality) of the XR data in the network. The three parts of information: the XQI information, the first evaluation information, and the second evaluation information may be independently obtained from a corresponding network element. The third evaluation information obtained based on the XQI information, the first evaluation information, and the second evaluation information can reflect user experience in an entire end-to-end process of the XR service.

For example, the first evaluation information, the second evaluation information, and the third evaluation information respectively indicate the first MOS, the second MOS, and the third MOS, and the XQI information indicates the XQI. The third MOS may satisfy the following formula:

$$\text{Third } MOS = f3(XQI, \text{first } MOS, \text{second } MOS), \text{ where}$$

"f3(XQI, first MOS, second MOS)" represents a function f3 using the XQI, the first MOS, and the second MOS as independent variables. For example, the third MOS may satisfy one of the following formulas:

$$\text{Third } MOS = f3(XQI, \text{first } MOS, \text{second } MOS) = XQI + \text{first } MOS + \text{second } MOS, \text{ or}$$

$$\text{Third } MOS = f3(XQI, \text{first } MOS, \text{second } MOS) = w_X * XQI + w_{M1} * \text{first } MOS + w_{M2} * \text{second } MOS,$$
where $w_X$, $w_{M1}$, and $w_{M2}$ respectively represent weighting coefficients corresponding to the XQI, the first MOS, and the second MOS, and $w_X$, $w_{M1}$, and $w_{M2}$ may be real numbers greater than or equal to 0 and less than or equal to 1.

Optionally, if the part 740 is executed by a centralized controller or a chip, a chip system, or a processor in a centralized controller, the centralized controller or the chip, the chip system, or the processor in the centralized controller may obtain the first evaluation information reported by the server and the second evaluation information reported by the XR terminal. In addition, the centralized controller or the chip, the chip system, or the processor in the centralized controller may further obtain the XQI information reported by the network device.

User experience in the end-to-end process of the XR service can be obtained based on evaluation information about the data source, terminal, and transmission pipe of the XR service, so that an end-to-end comprehensive evaluation system can be established for the XR service, to guide the network operator to maintain and optimize the network based on the evaluation system to meet the requirement of the XR service.

The method 700 may further include an optional part 705: determining that a data type is extended reality data. Correspondingly, the part 705 may be implemented as follows: determining, based on the data type, to obtain, based on delay information and transmission error information, XQI information corresponding to a target rate, where the XQI information indicates transmission quality of the extended reality data. The determining that a data type is extended reality data may be understood as a trigger/request condition that can trigger/request obtaining the XQI information corresponding to the target rate based on the delay information and the transmission error information.

In this implementation, after it is learned that the data type is the extended reality data, the XQI information indicating the transmission quality of the extended reality data is obtained based on a corresponding parameter, so that XQI-based transmission quality measurement and evaluation can be performed on the extended reality data more pertinently, to guide the network design for data of the XR type, and guide the network operator to maintain and optimize the network based on the requirement of the XR data.

There may be a plurality of different implementations of determining that the data type is the extended reality data.

In an implementation of determining that the data type is the extended reality data, data type information may be obtained, and it is determined, based on the data type information, that the data type is the extended reality data.

For example, the data type information may indicate that the data type is the extended reality data.

There may be a plurality of different implementations of obtaining the foregoing data type information.

In an implementation of obtaining the data type information, when the method 700 is performed by a terminal or a component of a terminal, downlink control information (DCI) or higher layer signaling (for example, RRC signaling) from a network device may be received to obtain the data type information. The DCI may be carried on a physical downlink control channel (PDCCH) or a physical downlink shared channel (PDSCH), and the higher layer signaling may be carried on the PDCCH or the PDSCH.

For example, the DCI may include an indication field indicating the data type, where the indication field includes the data type information. When the indication field indicates a predefined value, it may indicate that the data type is the extended reality data. The indication field may be a newly introduced indication field, or may be an original indication field reused in the DCI.

For another example, the data type may be indicated in a DCI format, that is, the DCI format may be understood as the foregoing data type information. When the DCI is in a predefined format, it may indicate that the data type is the extended reality data.

For another example, the RRC signaling may include an indication field/information element indicating the data type, where the indication field/information element includes the data type information. When the indication field/information element indicates a predefined value, it may indicate that the data type is the extended reality data. The indication field/information element may be a newly introduced indication field/information element, or may be an original indication field/information element reused in the RRC signaling.

In another implementation of obtaining the data type information network, when the method 700 is performed by a network device or a component of a network device, or when the method 700 is performed by a centralized controller or a component of a centralized controller, uplink control information (UCI) or higher layer signaling (for example, RRC signaling) from a terminal may be received to obtain the data type information. The UCI may be carried on a physical uplink control channel (PUCCH) or a physical uplink shared channel (PUSCH), and the higher layer signaling may be carried on the PUCCH or the PUSCH.

For example, the UCI may include an indication field indicating the data type, where the indication field includes the data type information. When the indication field indicates a predefined value, it may indicate that the data type is the extended reality data. The indication field may be a newly introduced indication field, or may be an original indication field reused in the UCI.

For another example, the data type may be indicated in a UCI format, that is, the UCI format may be understood as the foregoing data type information. When the UCI is in a predefined format, it may indicate that the data type is the extended reality data.

For another example, the RRC signaling may include an indication field/information element indicating the data type, where the indication field/information element includes the data type information. When the indication field/information element indicates a predefined value, it may indicate that the data type is the extended reality data. The indication field/information element may be a newly introduced indication field/information element, or may be an original indication field/information element reused in the RRC signaling.

In another implementation of determining that the data type is extended real data, when the method 700 is performed by a terminal or a component of a terminal, or when the method 700 is performed by a network device or a component of a network device, or when the method 700 is performed by a centralized controller or a component of a centralized controller, the data type may be obtained based on a service characteristic of the data. For example, the data type corresponding to the data may be learned based on a data periodicity and/or a data packet size. For example, when the data periodicity is 16.7 ms or 8.3 ms, and/or when the data packet size is 0.6 megabits (Mb) to 0.65 Mb, it may be learned that the data type corresponding to the data is the extended reality data.

In another implementation of determining that the data type is the extended reality data, the data type may be determined based on configuration information of a core network. For example, when sending data, the core network configures a data type of the data as extended reality data, and notifies a base station and/or a terminal of the configuration information, so that the base station and/or the terminal can determine the data type of the data.

Figure 7B:
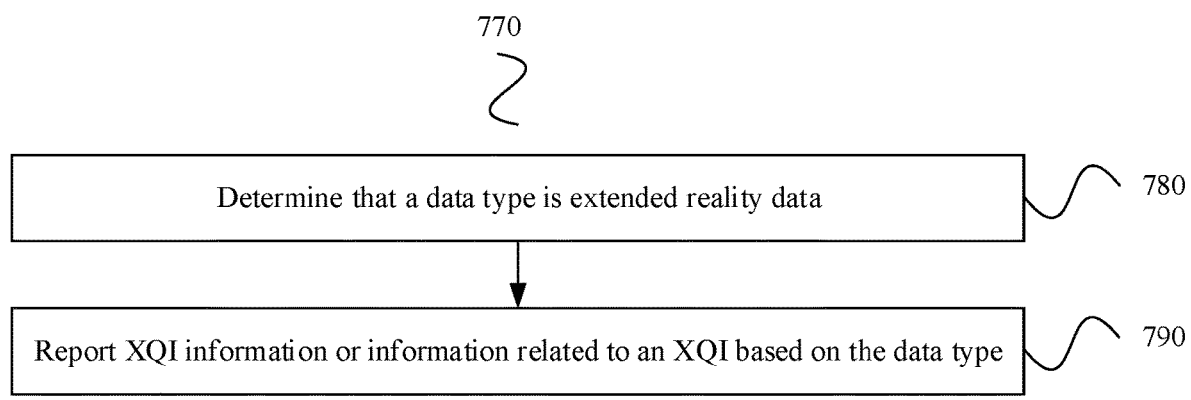

FIG. 7B is a flowchart of another communication method 770 according to an embodiment of this application. The method may be executed by a terminal (for example, an XR terminal), or may be executed by a chip, a chip system, a processor, or the like that supports the terminal in implementing the method. The method may be executed by a network device (for example, a core network device, an access network device, a Wi-Fi router, or a Wi-Fi access point), or may be executed by a chip, a chip system, a processor, or the like that supports the network device in implementing the method. The method may be executed by a server (for example, a cloud server), or may be executed by a chip, a chip system, a processor, or the like that supports the server in implementing the method. The method may be executed by a centralized controller, or may be executed by a chip, a chip system, a processor, or the like that supports the centralized controller in implementing the method. Execution bodies of parts in FIG. 7B may be the same or may be different. As shown in FIG. 7B, the method 770 in this embodiment may include a part 780 and a part 790.

Part 780: Determine that a data type is extended reality data. Content of the part 780 is the same as that of the part 705 in the method 700, and details are not described herein again.

Part 790: Report XQI information or information related to an XQI based on the foregoing data type. Optionally, the information related to the XQI includes one or more of PDB information, delay variation information, average delay information, delay variance information, PER information, BLER information, retransmission information, average packet loss rate information, burst packet loss rate information, or first packet response time information related to the extended reality data. That the data type is the extended reality data may be understood as a trigger/request condition that can trigger/request reporting of the XQI information, or trigger/request reporting of the information related to the XQI.

In this implementation, after it is learned that the data type is the extended reality data, the XQI information related to the extended reality data is reported or parameter information required by the XQI is obtained, so that XQI-based transmission quality measurement and evaluation can be performed on the extended reality data more pertinently, to guide the network design for data of the XR type, and guide the network operator to maintain and optimize the network based on the requirement of the XR data.

It may be understood that the method 770 shown in FIG. 7B may also be implemented in combination with the method 700 shown in FIG. 7A. For example, when the XQI information is reported in the part 790, the part 710 in the method 700 may be performed between the part 780 and the part 790, and to-be-reported XQI information is first obtained based on the delay information and the transmission error information before the XQI information is reported. Alternatively, the method 770 shown in FIG. 7B may be implemented in combination with another part (for example, one or more of the part 720, the part 730, the part 740, or the part 750) in the method 700 shown in FIG. 7A. Details are not described herein again.

Figure 8:
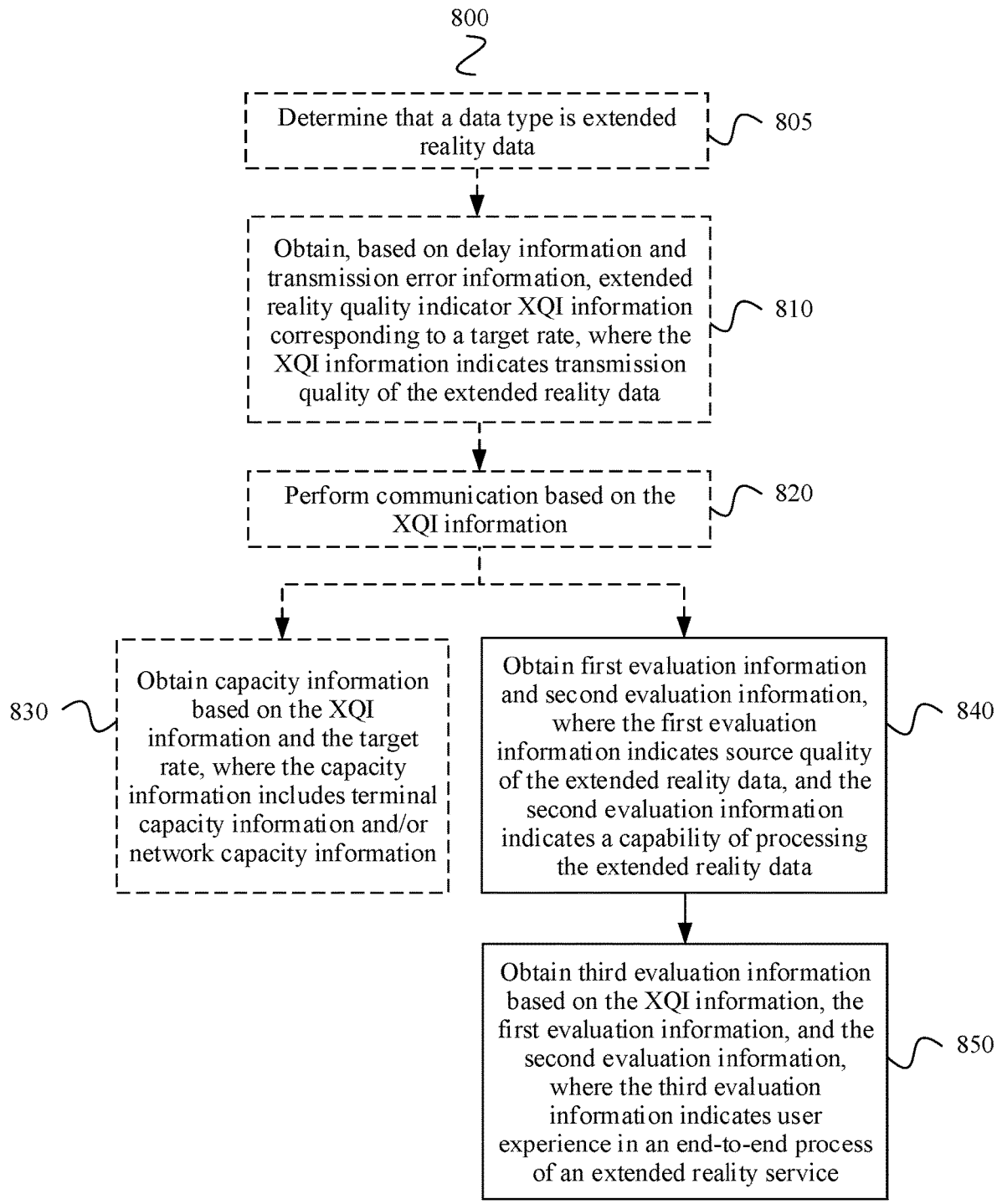

FIG. 8 is a flowchart of another communication method 800 according to an embodiment of this application. The method may be executed by a terminal (for example, an XR terminal), or may be executed by a chip, a chip system, a processor, or the like that supports the terminal in implementing the method. The method may be executed by a network device (for example, a core network device, an access network device, a Wi-Fi router, or a Wi-Fi access point), or may be executed by a chip, a chip system, a processor, or the like that supports the network device in implementing the method. The method may be executed by a server (for example, a cloud server), or may be executed by a chip, a chip system, a processor, or the like that supports the server in implementing the method. The method may be executed by a centralized controller, or may be executed by a chip, a chip system, a processor, or the like that supports the centralized controller in implementing the method. Execution bodies of parts in FIG. 8 may be the same or may be different. As shown in FIG. 8, the method 800 in this embodiment may include a part 840 and a part 850. Content of the part 840 is the same as that of the part 740 in the method 700, content of the part 850 is the same as that of the part 750 in the method 700, and corresponding beneficial effects are the same as beneficial effects corresponding to the part 740 and the part 750 in the method 700. Details are not described herein again.

Optionally, the method 800 may further include a part 810 and a part 820. Content of the part 810 is the same as that of the part 710 in the method 700, content of the part 820 is the same as that of the part 720 in the method 700, and corresponding beneficial effects are the same as beneficial effects corresponding to the part 710 and the part 720 in the method 700. Details are not described herein again.

Optionally, the method 800 may further include a part 830. Content of the part 830 is the same as that of the part 730 in the method 700, and corresponding beneficial effects are the same as beneficial effects corresponding to the part 730 in the method 700. Details are not described herein again.

Optionally, the method 800 may further include a part 805. Content of the part 805 is the same as that of the part 705 in the method 700, and corresponding beneficial effects are the same as beneficial effects corresponding to the part 705 in the method 700. Details are not described herein again.

Figure 9:
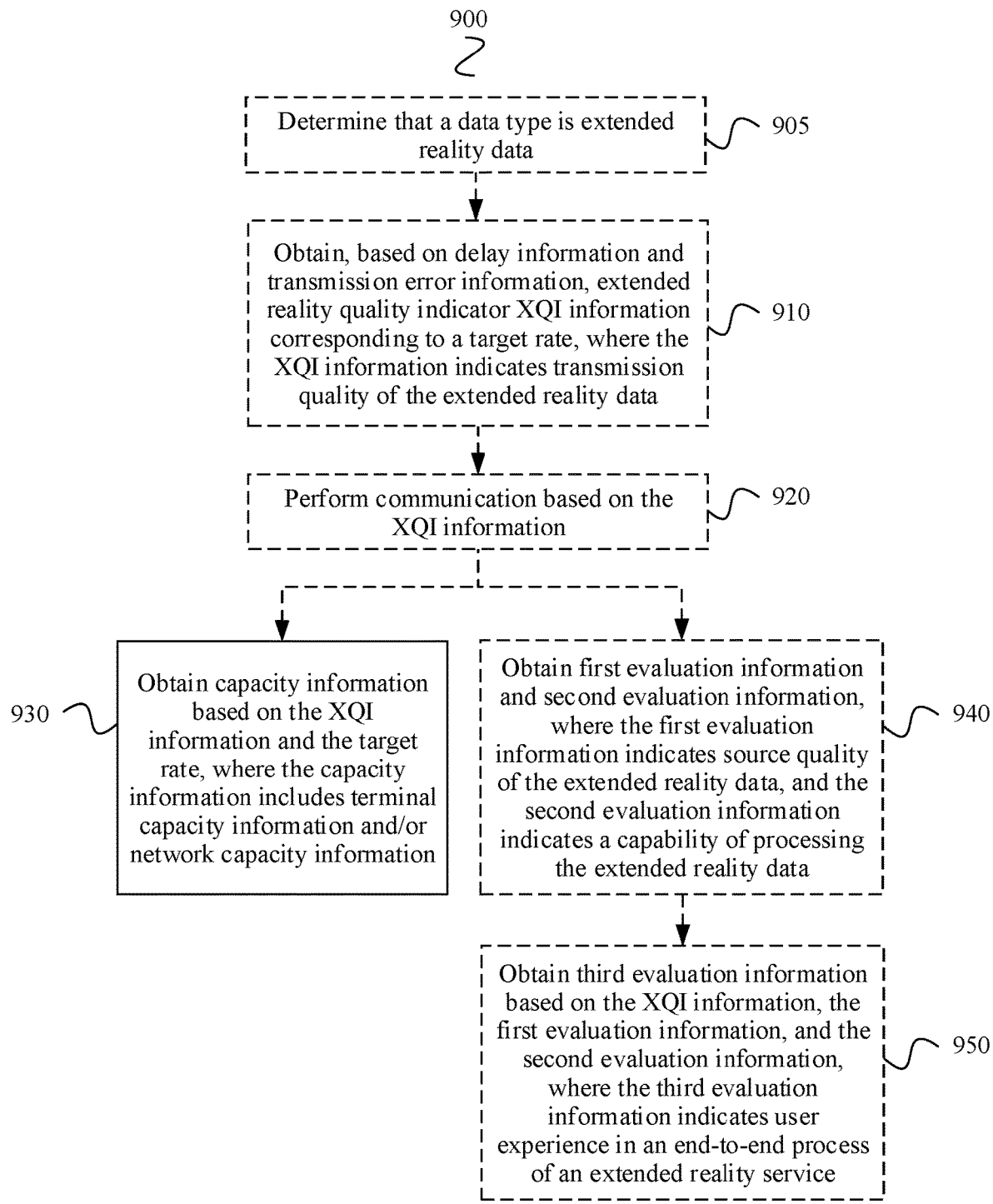

FIG. 9 is a flowchart of another communication method 900 according to an embodiment of this application. The method may be executed by a terminal (for example, an XR terminal), or may be executed by a chip, a chip system, a processor, or the like that supports the terminal in implementing the method. The method may be executed by a network device (for example, a core network device, an access network device, a Wi-Fi router, or a Wi-Fi access point), or may be executed by a chip, a chip system, a processor, or the like that supports the network device in implementing the method. The method may be executed by a server (for example, a cloud server), or may be executed by a chip, a chip system, a processor, or the like that supports the server in implementing the method. The method may be executed by a centralized controller, or may be executed by a chip, a chip system, a processor, or the like that supports the centralized controller in implementing the method. Execution bodies of parts in FIG. 9 may be the same or may be different. As shown in FIG. 9, the method 900 in this embodiment may include a part 930. Content of the part 930 is the same as that of the part 730 in the method 700, and corresponding beneficial effects are the same as beneficial effects corresponding to the part 730 in the method 700. Details are not described herein again.

Optionally, the method 900 may further include a part 910 and a part 920. Content of the part 910 is the same as that of the part 710 in the method 700, content of the part 920 is the same as that of the part 720 in the method 700, and corresponding beneficial effects are the same as beneficial effects corresponding to the part 710 and the part 720 in the method 700. Details are not described herein again.

Optionally, the method 900 may further include a part 940 and a part 950. Content of the part 940 is the same as that of the part 740 in the method 700, content of the part 950 is the same as that of the part 750 in the method 700, and corresponding beneficial effects are the same as beneficial effects corresponding to the part 740 and the part 750 in the method 700. Details are not described herein again.

Optionally, the method 900 may further include a part 905. Content of the part 905 is the same as that of the part 705 in the method 700, and corresponding beneficial effects are the same as beneficial effects corresponding to the part 705 in the method 700. Details are not described herein again.

Corresponding to the method provided in the foregoing method embodiments, an embodiment of this application further provides a corresponding apparatus. The apparatus includes a corresponding module configured to perform the foregoing embodiments. The module may be software, hardware, or a combination of software and hardware.

Figure 10:
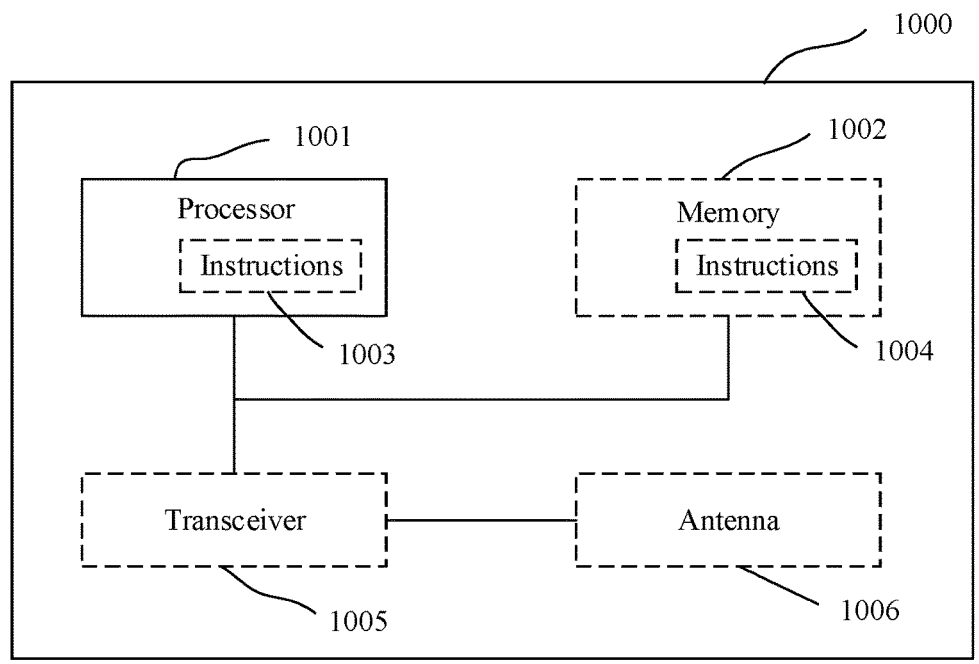
FIG. 10 is a diagram of a structure of a communication apparatus according to an embodiment of this application.

FIG. 10 is a diagram of a structure of an apparatus. The apparatus 1000 may be a network device, a terminal device, a server, or a centralized controller, or may be a chip, a chip system, or a processor that supports the network device, the terminal device, the server, or the centralized controller in implementing the foregoing method. The apparatus may be configured to implement the methods described in the foregoing method embodiments. For details, refer to the descriptions in the foregoing method embodiments.

The apparatus 1000 may include one or more processors 1001. The processor 1001 may also be referred to as a processing unit, and may implement a control function. The processor 1001 may be a general-purpose processor, a dedicated processor, or the like. For example, the processor 1001 may be a baseband processor or a central processing unit. The baseband processor may be configured to process a communication protocol and communication data. The central processing unit may be configured to control a communication apparatus (for example, a base station, a baseband chip, a terminal, a terminal chip, a DU, or a CU), execute a software program, and process data of the software program.

In an optional design, the processor 1001 may alternatively store instructions and/or data 1003, and the instructions and/or data 1003 may be run by the processor, so that the apparatus 1000 performs the methods described in the foregoing method embodiments.

In another optional design, the processor 1001 may include a transceiver unit configured to implement receiving and sending functions. For example, the transceiver unit may be a transceiver circuit, an interface, an interface circuit, or a communication interface. The transceiver circuits, the interfaces, or the interface circuits configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another embodiment, the apparatus 1000 may include a circuit, and the circuit may implement the sending, receiving, or communication function in the foregoing method embodiments.

Optionally, the apparatus 1000 may include one or more memories 1002. The memory 1002 may store instructions 1004, and the instructions may be run on the processor, so that the apparatus 1000 performs the methods described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the apparatus 1000 may further include a transceiver 1005 and/or an antenna 1006. The processor 1001 may be referred to as a processing unit, and control the apparatus 1000. The transceiver 1005 may be referred to as a transceiver unit, a transceiver machine, a transceiver circuit, a transceiver apparatus, a transceiver module, or the like, and is configured to implement sending and receiving functions.

Optionally, the apparatus 1000 in this embodiment of this application may be configured to perform the method described in FIG. 7A, FIG. 7B, FIG. 8, or FIG. 9 in embodiments of this application.

The processor and the transceiver in this application may be implemented in an integrated circuit (IC), an analog IC, a radio frequency integrated circuit RFIC, a mixed signal IC, an application-specific integrated circuit (ASIC), a printed circuit board (PCB), an electronic device, or the like. The processor and the transceiver may also be fabricated by using various IC process technologies, for example, a complementary metal oxide semiconductor (CMOS), an n-type metal oxide semiconductor (NMOS), a p-type metal oxide semiconductor (PMOS), a bipolar junction transistor (BJT), a bipolar CMOS (BiCMOS), silicon germanium (SiGe), and gallium arsenide (GaAs).

The apparatus described in the foregoing embodiments may be a network device or a terminal device. However, a range of the apparatus described in this application is not limited thereto, and a structure of the apparatus may not be limited to FIG. 10. The apparatus may be an independent device, or may be a part of a larger device. For example, the apparatus may be:

(1) an independent integrated circuit IC, a chip, or a chip system or subsystem;
(2) a set of one or more ICs, where optionally, the IC set may further include a storage component configured to store data and/or instructions;
(3) an ASIC, for example, a modem (MSM);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or
(6) others, or the like.

Figure 11:
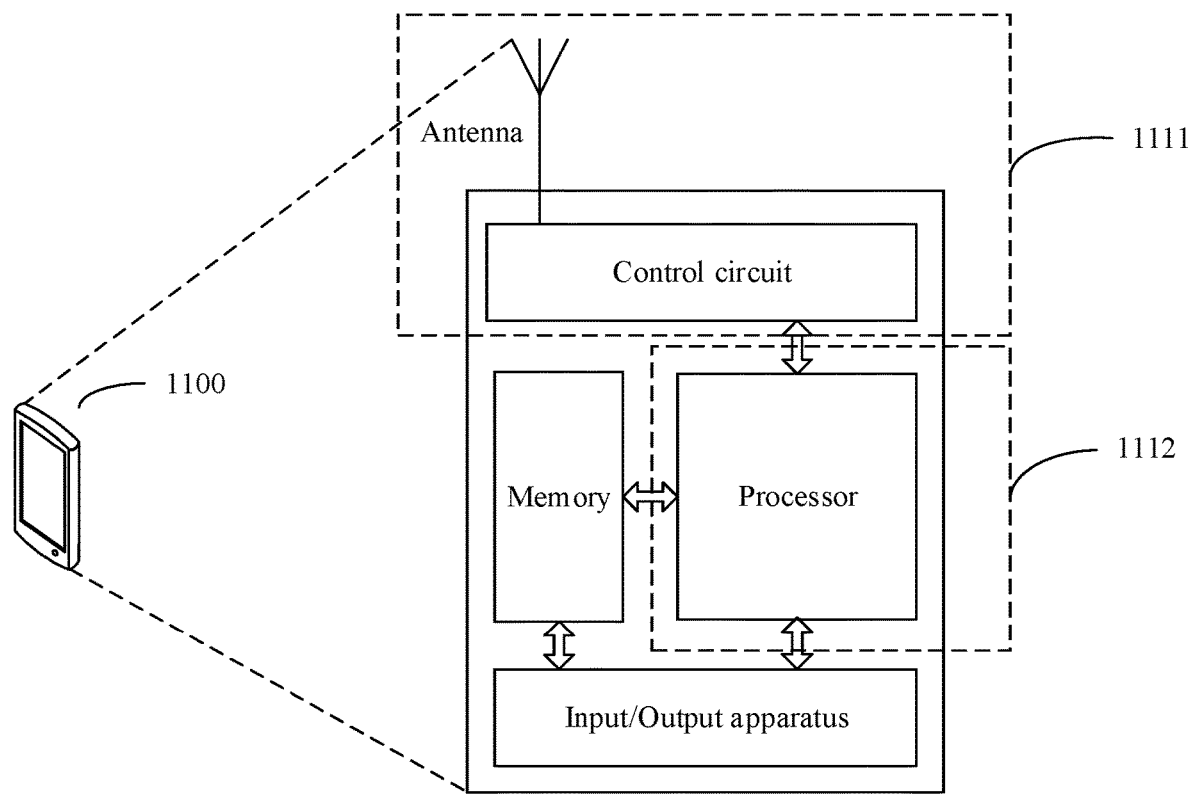
FIG. 11 is a diagram of a structure of a terminal according to an embodiment of this application.

FIG. 11 provides a diagram of a structure of a terminal device. The terminal device is applicable to the scenario shown in FIG. 1, FIG. 4, FIG. 5, or FIG. 6. For ease of description, FIG. 11 shows only main components of the terminal device. As shown in FIG. 11, the terminal device 1100 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. The radio frequency circuit is mainly configured to: perform conversion between a baseband signal and a radio frequency signal, and process the radio frequency signal. The antenna is mainly configured to send and receive the radio frequency signal in a form of an electromagnetic wave. The input/output apparatus, such as a touchscreen, a display, or a keyboard, is mainly configured to: receive data input by a user and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in an electromagnetic wave form by using the antenna. When data is sent to the terminal device, the radio frequency circuit receives the radio frequency signal through the antenna, further converts the radio frequency signal into a baseband signal, and outputs the baseband signal to the processor. The processor converts the baseband signal into data, and processes the data.

For ease of description, FIG. 11 shows only one memory and one processor. In an actual terminal device, there may be a plurality of processors and a plurality of memories. The memory may also be referred to as a storage medium, a storage device, or the like. This is not limited in this embodiment of the present application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 11 is integrated with functions of the baseband processor and the central processing unit. A person skilled in the art may understand that, the baseband processor and the central processing unit may be independent processors, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program, and the processor executes the software program to implement a baseband processing function.

In an example, the antenna and the control circuit that have sending and receiving functions may be considered as a transceiver unit 1111 of the terminal device 1100, and the processor having a processing function may be considered as a processing unit 1112 of the terminal device 1100. As shown in FIG. 11, the terminal device 1100 includes the transceiver unit 1111 and the processing unit 1112. The transceiver unit may also be referred to as a transceiver, a transceiver machine, a transceiver apparatus, or the like. Optionally, a component that is in the transceiver unit 1111 and that is configured to implement a receiving function may be considered as a receiving unit, and a component that is in the transceiver unit 1111 and that is configured to implement a sending function may be considered as a sending unit. In other words, the transceiver unit 1111 includes the receiving unit and the sending unit. For example, the receiving unit may also be referred to as a receiver machine, a receiver, a receiver circuit, or the like. The sending unit may be referred to as a transmitter machine, a transmitter, a transmitter circuit, or the like. Optionally, the receiving unit and the sending unit may be one integrated unit, or may be a plurality of independent units. The receiving unit and the sending unit may be in one geographical position, or may be distributed in a plurality of geographical positions.

Figure 12:
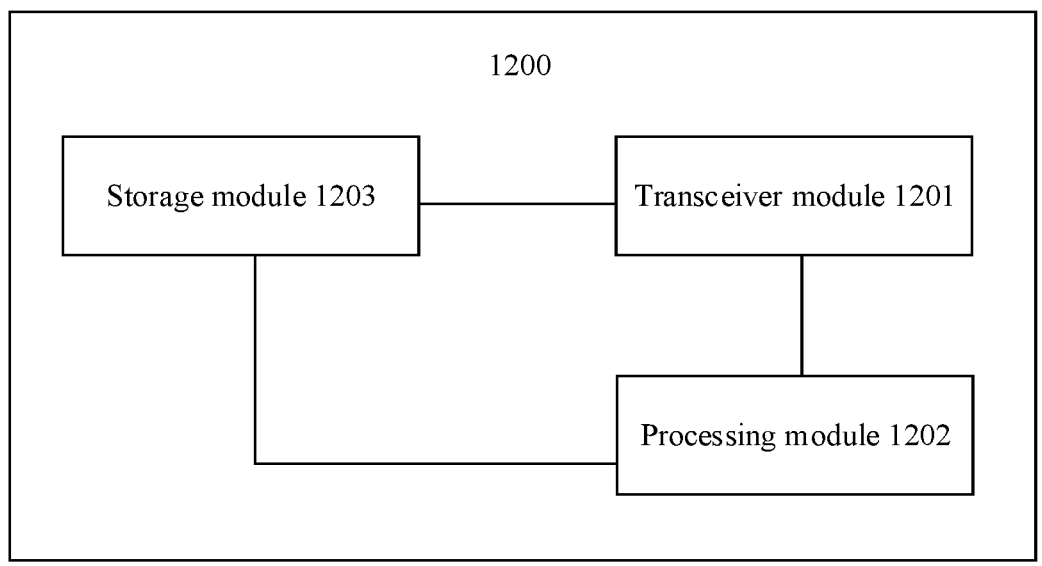
FIG. 12 is a diagram of another communication apparatus according to an embodiment of this application.

As shown in FIG. 12, another embodiment of this application provides an apparatus 1200. The apparatus may be a terminal, a network device, a server, or a centralized controller, or may be a component (for example, an integrated circuit or a chip) of a terminal, a network device, a server, or a centralized controller. Alternatively, the apparatus may be another communication module configured to implement the methods in the method embodiments of this application. The apparatus 1200 may include a processing module 1202 (or referred to as a processing unit). Optionally, the apparatus 1200 may further include a transceiver module 1201 (or referred to as a transceiver unit or a communication interface) and a storage module 1203 (or referred to as a storage unit).

In an embodiment, one or more modules in FIG. 12 may be implemented by one or more processors, or may be implemented by one or more processors and memories, or may be implemented by one or more processors and transceivers, or may be implemented by one or more processors, memories, and transceivers. This is not limited in this embodiment of this application. The processor, the memory, and the transceiver may be disposed separately, or may be integrated.

The apparatus has a function of implementing the terminal described in embodiments of this application. For example, the apparatus includes a corresponding module, unit, or means used for the terminal to perform the steps that are related to the terminal and that are described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiments. Alternatively, the apparatus has a function of implementing the network device described in embodiments of this application. For example, the apparatus includes a corresponding module, unit, or means used for the network device to perform the steps that are related to the network device and that are described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiments.

Optionally, the modules in the apparatus 1200 in this embodiment of this application may be configured to perform the method described in FIG. 7A, FIG. 7B, FIG. 8, or FIG. 9 in embodiments of this application.

In an embodiment, the apparatus 1200 may include a processing module 1202 and a transceiver module 1201. The processing module 1202 is configured to: obtain, based on delay information and transmission error information, XQI information corresponding to a target rate, where the XQI information indicates transmission quality of the extended reality data. The processing module 1202 is further configured to control the transceiver module 1201 to perform communication based on the XQI information. For example, the processing module 1202 may be configured to control the transceiver module 1201 to output the XQI information. For another example, the processing module 1202 may be configured to control, based on the XQI information, the transceiver module 1201 to send or receive XR data.

Because the XQI information can represent transmission quality of the XR data in a network, objective impact on the XR data in network transmission can be systematically evaluated by using the apparatus, to guide a network operator to maintain and optimize the network based on a requirement of the XR data.

Optionally, the delay information includes PDB information and/or delay variation information.

Optionally, the transmission error information includes one or more of PER information, BLER information, or retransmission information.

Optionally, the target rate includes a source rate and/or a network transmission rate of the extended reality data.

Optionally, the XQI information corresponds to a first extended reality data stream and a second extended reality data stream. The first extended reality data stream includes an extended reality base layer data stream, and the second extended reality data stream includes an extended reality enhancement layer data stream. Alternatively, the first extended reality data stream includes an extended reality in-FOV data stream, and the second extended reality data stream includes an extended reality out-of-FOV data stream. Further optionally, the XQI information includes first XQI information and second XQI information, the first XQI information corresponds to the first extended reality data stream, and the second XQI information corresponds to the second extended reality data stream.

In some implementations of the apparatus 1200, the processing module 1202 is further configured to obtain capacity information based on the XQI information and the target rate, and the capacity information includes terminal capacity information and/or network capacity information.

In some implementations of the apparatus 1200, the processing module 1202 is further configured to: obtain first evaluation information and second evaluation information, and obtain third evaluation information based on the XQI information, the first evaluation information, and the second evaluation information. The first evaluation information indicates source quality of the extended reality data, the second evaluation information indicates a capability of processing the extended reality data, the third evaluation information indicates user experience in an end-to-end process of an extended reality service, and the end-to-end process includes generation of the extended reality data, transmission of the extended reality data, and processing of the extended reality data.

In some implementations of the apparatus 1200, the processing module 1202 is further configured to determine that a data type is extended reality data. That the processing module 1202 is configured to: obtain, based on delay information and transmission error information, XQI information corresponding to a target rate is specifically implemented as follows: The processing module 1202 is configured to: determine, based on the data type, to obtain, based on delay information and transmission error information, XQI information corresponding to a target rate.

In an implementation of that the processing module 1202 is configured to determine that the data type is the extended reality data, the processing module 1202 is further configured to: obtain data type information, and determine, based on the data type information, that the data type is the extended reality data. For example, the transceiver module 1201 may be configured to receive DCI or higher layer signaling, and the processing module 1202 may be configured to obtain the data type information based on the DCI or the higher layer signaling. For another example, the transceiver module 1201 may be configured to receive UCI or higher layer signaling, and the processing module 1202 may be configured to obtain the data type information based on the UCI or the higher layer signaling.

In another implementation of that the processing module 1202 is configured to determine that the data type is the extended reality data, the processing module 1202 is configured to: determine, based on a service characteristic of the data, that the data type is the extended reality data.

In another implementation of that the processing module 1202 is configured to determine that the data type is the extended reality data, the processing module 1202 is configured to: determine, based on configuration information of a core network, that the data type is the extended reality data.

In another implementation, the apparatus 1200 may include a processing module 1202 and a transceiver module 1201. The processing module 1202 is configured to determine that a data type is extended reality data. The processing module 1202 is further configured to control, based on the data type, the transceiver module 1201 to report XQI information or report information related to an XQI. Optionally, the information related to the XQI includes one or more of PDB information, delay variation information, average delay information, delay variance information, PER information, BLER information, retransmission information, average packet loss rate information, burst packet loss rate information, or first packet response time information related to the extended reality data.

In some implementations of the apparatus 1200, when the XQI information is reported, the processing module 1202 may further obtain to-be-reported XQI information based on delay information and transmission error information before the transceiver module 1201 reports the XQI information.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions. Details are not described herein.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the functions for corresponding application, but it should not be considered that the implementation goes beyond the scope of embodiments of this application.

It may be understood that, the processor in embodiments of this application may be an integrated circuit chip, and has a signal processing capability. In an implementation process, the steps in the foregoing method embodiments may be completed by using a hardware integrated logic circuit or instructions in a form of software in the processor. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component.

The solutions described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logic apparatus, a discrete gate or transistor logic device, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

It may be understood that the memory in embodiments of this application may be a transitory memory or a non-transitory memory, or may include both a transitory memory and a non-transitory memory. The non-transitory memory may be a read-only memory (ROM), a programmable read-only memory (PROM), an erasable programmable read-only memory (EPROM), an electrically erasable programmable read-only memory (EEPROM), or a flash memory. The transitory memory may be a random access memory (RAM) and is used as an external cache. By way of example but not limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and the method described in this specification is intended to include, but not limited to, these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, a function of any one of the foregoing method embodiments is implemented.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high density digital video disc (DVD)), a semiconductor medium (for example, a solid state drive (SSD)), or the like.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, but do not constitute a limitation on time, do not require that the apparatus have a determining action during implementation, and do not mean any other limitation.

"Simultaneously" in this application may be understood as being at a same time point, may be understood as being within a time period, or may be understood as being within a same periodicity.

A person skilled in the art may understand that first, second, and various reference numerals in this application are for distinguishing only for ease of description, and are not used to limit the scope of embodiments of this application. A specific value of a numeral (which may also be referred to as an index), a specific value of a quantity, and a position in this application are only used as an example, but are not unique representation forms, and are not used to limit the scope of embodiments of this application. First, second, and various reference numerals in this application are also for distinguishing only for ease of description, and are not used to limit the scope of embodiments of this application.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship for describing associated objects and represents that three relationships may exist. For example, A and/or B may represent the following three cases: Only A exists, both A and B exist, and only B exists. A may be singular or plural, and B may be singular or plural. The character "/" usually indicates an "or" relationship between associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B and C all exist. A may be singular or plural, B may be singular or plural, and C may be singular or plural.

It may be understood that, in embodiments of this application, "B corresponding to A" indicates that B is associated with A, and B may be determined based on A. However, it should be further understood that determining B based on A does not mean that B is determined based on only A. B may alternatively be determined based on A and/or other information.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

A person of ordinary skill in the art may understand that, for a purpose of convenient and brief descriptions, for a detailed working process of the foregoing system, apparatus, and unit, refer to a corresponding process in the foregoing method embodiments. Details are not described herein again.

It may be understood that the system, apparatus, and method described in this application may alternatively be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium, and includes instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method according to an internal logical relationship thereof. The foregoing descriptions are implementations of this application, but are not intended to limit the protection scope of this application.

The foregoing descriptions are merely implementations of this application, but are not intended to limit the protection scope of this application. Any variation or replacement readily figured out by a person skilled in the art within the technical scope disclosed in this application shall fall within the protection scope of this application.

What is claimed is:

1. A communication method, comprising:
   determining that a data type is extended reality data;
   obtaining an extended reality quality indicator (XQI) information corresponding to a target rate, the obtaining being based on the data type, a delay information, and a transmission error information, the XQI information indicating a transmission quality of the extended reality data, the XQI information corresponding to an extended reality base layer data stream and an extended reality enhancement layer data stream;
   performing communication based on the XQI information; and
   obtaining first evaluation information and second evaluation information, the first evaluation information indicating a source quality of the extended reality data and the second evaluation information indicating a capability of processing the extended reality data;
   wherein the source quality of the XR data is used to evaluate one or more of: an image quality definition, an image smoothness, an image stereoscopy, an image distortion, a frame rate, or an audio quality; and
   wherein the capability of processing the XR data is used to evaluate a capability of one or more of: a supported FOV angle or a refresh rate.

2. The method according to claim 1, wherein the delay information comprises at least one of a packet delay budget (PDB) information, a delay variation information, or a packet average delay information.

3. The method according to claim 1, wherein the transmission error information comprises one or more of packet error rate (PER) information, block error rate (BLER) information, or retransmission information.

4. The method according to claim 1, wherein the target rate comprises at least one of a source rate or a network transmission rate of the extended reality data.

5. The method according to claim 1, wherein the method further comprises:
   obtaining capacity information based on the XQI information and the target rate, wherein the capacity information comprises at least one of a terminal capacity information or a network capacity information.

6. An apparatus, comprising:
   a memory storing instructions; and
   at least one processor in communication with the memory, the at least one processor configured, upon execution of the instructions, to perform the following steps:
   determine that a data type is extended reality data;
   obtain an extended reality quality indicator (XQI) information corresponding to a target rate, the obtaining being based on the data type, a delay information, and a transmission error information, the XQI information indicating a transmission quality of the extended reality data, the XQI information corresponding to an extended reality base layer data stream and an extended reality enhancement layer data stream;

perform communication based on the XQI information; and obtain first evaluation information and second evaluation information, the first evaluation information indicating a source quality of the extended reality data and the second evaluation information indicating a capability of processing the extended reality data;

wherein the source quality of the XR data is used to evaluate one or more of: an image quality definition, an image smoothness, an image stereoscopy, an image distortion, a frame rate, or an audio quality; and wherein the capability of processing the XR data is used to evaluate a capability of one or more of: a supported FOV angle or a refresh rate.

7. The apparatus according to claim 6, wherein the delay information comprises at least one of a packet delay budget (PDB) information, a delay variation information, or a packet average delay information.

8. The apparatus according to claim 6, wherein the transmission error information comprises one or more of a packet error rate (PER) information, a block error rate (BLER) information, or a retransmission information.

9. The apparatus according to claim 6, wherein the target rate comprises at least one of a source rate or a network transmission rate of the extended reality data.

10. The apparatus according to claim 6, wherein the apparatus is further caused to:

obtain capacity information based on the XQI information and the target rate, wherein the capacity information comprises at least one of a terminal capacity information or a network capacity information.

11. A non-transitory computer readable media storing computer instructions, that configure at least one processor, upon execution of the instructions, to perform the following steps:

determining that a data type is extended reality data;

obtaining an extended reality quality indicator (XQI) information corresponding to a target rate, the obtaining being based on the data type, a delay information, and a transmission error information, the XQI information indicating a transmission quality of the extended reality data, the XQI information corresponding to an extended reality base layer data stream and extended reality enhancement layer data stream;

performing communication based on the XQI information; and obtaining first evaluation information and second evaluation information, the first evaluation information indicating a source quality of the extended reality data and the second evaluation information indicating a capability of processing the extended reality data;

wherein the source quality of the XR data is used to evaluate one or more of: an image quality definition, an image smoothness, an image stereoscopy, an image distortion, a frame rate, or an audio quality; and wherein the capability of processing the XR data is used to evaluate a capability of one or more of: a supported FOV angle or a refresh rate.

12. The non-transitory computer readable medium according to claim 11, wherein the delay information comprises at least one of a packet delay budget (PDB) information, a delay variation information, or a packet average delay information.

13. The non-transitory computer readable medium according to claim 11, wherein the transmission error information comprises one or more of a packet error rate (PER) information, a block error rate (BLER) information, or a retransmission information.

14. The non-transitory computer readable medium according to claim 11, wherein the target rate comprises at least one of a source rate or a network transmission rate of the extended reality data.

* * * * *